(12) United States Patent
Leighton

(10) Patent No.: US 12,046,780 B1
(45) Date of Patent: Jul. 23, 2024

(54) FUEL CELLS AS POWER SOURCES FOR CHARGING ELECTRIC VEHICLES AND OTHER ELECTRIC LOADS

(71) Applicant: Hybiquity, Inc., White Plains, NY (US)

(72) Inventor: Carl W. Leighton, White Plains, NY (US)

(73) Assignee: Hybiquity, Inc., White Plains, NY (US)

( * ) Notice: Subject to any disclaimer, the term of this patent is extended or adjusted under 35 U.S.C. 154(b) by 0 days.

(21) Appl. No.: 17/731,937

(22) Filed: Apr. 28, 2022

Related U.S. Application Data

(60) Provisional application No. 63/180,922, filed on Apr. 28, 2021.

(51) Int. Cl.
| | |
|---|---|
| *B60L 53/30* | (2019.01) |
| *B60L 53/54* | (2019.01) |
| *H01M 8/04082* | (2016.01) |
| *H01M 8/04089* | (2016.01) |

(52) U.S. Cl.
CPC ......... *H01M 8/04201* (2013.01); *B60L 53/30* (2019.02); *B60L 53/54* (2019.02); *H01M 8/04089* (2013.01)

(58) Field of Classification Search
CPC .......... H01M 8/04201; H01M 8/04089; B60L 53/30; B60L 53/54
See application file for complete search history.

(56) References Cited

U.S. PATENT DOCUMENTS

2016/0090189 A1\* 3/2016 Wangemann .......... B64D 41/00
60/698

OTHER PUBLICATIONS

Estimated U.S. Energy Consumption in 2021 published by Lawrence Livermore National Laboratory (Mar. 2022) accessed at https://flowcharts.llnl.gov/sites/flowcharts/files/2022-04/Energy_2021_United-States_0.png, accessed on Apr. 24, 2022.
Report: How Are We Going to Build All That Clean Energy Infrastructure, Reed et al., Niskanen Center, published Aug. 2021 accessed at https://www.niskanencenter.org/wp-content/uploads/2021/08/CATF_Niskanen_CleanEnergyInfrastructure_Report.pdf, accessed on Apr. 24, 2022.
Hiroyuki Yumiya, et al. Toyota Fuel Cell System (TFCS). World Electric Vehicle Journal, vol. 7, 2015. 8 pages.

(Continued)

*Primary Examiner* — Ellen M McAvoy
*Assistant Examiner* — Chantel Graham
(74) *Attorney, Agent, or Firm* — Leason Ellis LLP

(57) ABSTRACT

A mobile generation resource (MGR) comprises a PEM fuel cell stack, hydrogen inputs and a hydrogen bus. A first hydrogen input receives hydrogen at 200 bars pressure which is stored in an onboard hydrogen tank. A second hydrogen input receives hydrogen at a pressure of 100 bars or less. The hydrogen bus, controlled by an MGR computing system, selects either the onboard hydrogen tank or the second hydrogen input as a hydrogen source for the fuel cell stack. A power take-off connection, cable and adapter provide DC electricity produced by the fuel cell stack at a power of at least 50 kilowatts. The MGR computing system communicates with the hydrogen bus and the power take-off connection, cable and adapter. A MGR user app instructs the MGR computing system to select the active source of hydrogen and to direct power produced by the fuel cell stack to the power take-off.

3 Claims, 24 Drawing Sheets

(56) References Cited

OTHER PUBLICATIONS

MY18 Mirai Fuel cell tech eBrochure, published 2018, accessed at https://www.toyota.com/content/ebrochure/2018/mirai_FuelCellTech.pdf on Feb. 28, 2021.
E.L. Lawler, et al. (1985), The Traveling Salesman Problem: A Guided Tour of Combinatorial Optimization, John Wiley & Sons, ISBN 0-471-90413-9.
Web site page, https://hysata.com/technology, published in 2021, accessed on Apr. 23, 2022.
Web site page, https://www.h2pro.co/technology, published 2021, access on Apr. 23, 2022.
Web site page, https://ravensr.com/steam-reformer-system/, published 2022, accessed on Apr. 24, 2022.
Web site page, https://www.sgh2energy.com/technology, published 2022, accessed on Apr. 24, 2022.
Web site page, https://monolith-corp.com/methane-pyrolysis, published 2022, accessed on Apr. 24, 2022.

* cited by examiner

|  | RDS No. 1 (40 Docks) | RDS No. 2 (20 Docks) | RDS No. 3 (20 Docks) | RDS No. 4 (10 Docks) | Total MGRs |
|---|---|---|---|---|---|
| At time 1, no. of docked MGRs | 20 | 15 | 10 | 2 | 47 |
| At time 2, no. of docked MGRs | 30 | 6 | 20 | 8 | 64 |
| At time 3, no. of docked MGRs | 38 | 20 | 18 | 8 | 84 |
| At time 4, no. of docked MGRs | 26 | 12 | 20 | 4 | 62 |

FUEL CELLS AS POWER SOURCES FOR CHARGING ELECTRIC VEHICLES AND OTHER ELECTRIC LOADS

CROSS REFERENCE TO RELATED APPLICATIONS

This application claims priority to U.S. Provisional Patent Application Ser. No. 63/180,922, filed Apr. 28, 2021, which is hereby incorporated by reference in its entirety.

FIELD OF INVENTION

The embodiments discussed below relate to the use of fuel cells as power sources for a variety of electric loads.

BACKGROUND

There is a broad scientific consensus that the global economy needs to reach a net zero carbon balance between the amount of greenhouse gas ("GHG") produced and the amount removed from the atmosphere. The largest source of anthropogenic GHG which is emitted as a result of global economic activity is $CO_2$; of these emissions, almost the entirety are created by the combustion of fossil fuels in connection with the generation of energy. The continued use of fossil fuels poses huge problems for society: the broad scientific consensus holds that the eventual consequences of the resulting climate change will be severe, even devastating to many countries.

In addition to the existential problems posed by the prospect of material and large amounts of climate change, there are several other very serious problems that are also attributable to continued reliance on fossil fuels, including: (i) environmental degradation; (ii) deleterious consequences for human health; (iii) impact on water resources; (iv) economically inefficient but continued substantial R&D expenditures regarding combustion-based technology; (v) financial costs of foreign aid and military support provided to many fossil fuel-producing nations; and (vi) unstable energy prices contributing to global economic and political instability.

One of the largest components of fossil fuel use is vehicular transportation (e.g., cars, trucks, buses, trains, boats, etc.), due to the reliance of most vehicles on internal combustion engines ("ICE") powered by fossil fuel. Another large fraction of the fossil fuel use in many countries is consumed in connection with the operation of residential and commercial buildings, primarily for space heating and hot water. Additionally, the substantial majority of the electricity in most countries is generated by combustion of fossil fuel.

For example, 79% of the 97.3 Quads of energy consumed by the United States in 2021 was provided by fossil fuels, with 32%, 11% and 36% of total energy consumption being provided by natural gas, coal and oil, respectively (see graphic depicting energy use in the United States by the utility sector, and by the residential, commercial, transportation and industrial sectors; "Estimated U.S. Energy Consumption in 2021: 97.3 Quads," at https://flowcharts.llnl.gov/sites/flowcharts/files/2022-04/Energy_2021_United-States_0.png, accessed on 4/24/2022.

There is broad agreement that in order to avoid material and large amounts of climate change, the global economy needs to achieve a net zero carbon balance by 2050. The tasks required to achieve this are daunting, and will require several decades to accomplish (see, e.g., https://www.niskanencenter.org/wp-content/uploads/2021/08/CATF_Niskanen_CleanEnergyInfrastructure_Report.pdf, accessed on 4/24/2022).

For most of the world (including the United States), two of the most difficult problems among the many different challenges relate to (i) the large amounts of electric generation using variable renewable energy ("VRE") that will need to be built and accessed, and (ii) anticipated functional deficits relating to the state of current grids.

Concerning VRE, because the electricity generated from VRE is quite variable in amount over the course of each day (and indeed, over days, weeks and seasons), and because electricity must be consumed as it is produced, a large amount of energy storage capacity must be built and connected to the grid. Additionally, when a large fraction of a grid's power is variable in magnitude, it is difficult for operators to maintain a stable AC frequency across the grid. This is due substantially to the concomitant reduction in inertial spinning reserves which are provided by the turbines used at thermal power plants: as the fossil fuel-based turbines are taken off line, the grid's spinning reserve is reduced, reducing the stability of AC frequency across the grid.

As to current and anticipated grid-related functional deficits, challenges include (i) the deficit in the geographic extent of current grids; (ii) the large fraction of current grids which is of considerable age; (iii) the limited capacity of current grids to provide increased amounts of electric power; (iv) current grids' deficit of bulk transmission resources that will be required to move future amounts of electricity generated by VRE from where it is generated to where it is consumed; and (v) the scope and extent of required improvements in the capacity of local distribution networks (e.g., replacing old, low-capacity wires, transformers and other hardware, etc).

There are a number of long-felt unmet needs relating to improvements in the grid. Further, there are a number of long-felt unmet needs for improvements relating to transportation-related systems. Further, there are a number of long-felt unmet needs for improvements relating to the energy-consuming systems which are used to support the built environment.

Further, there is a long-felt unmet need to reduce the amount of fossil fuels which may be used as energy sources for power generation by utilities and other entities in the course of utilities and other entities providing generation of electricity for the grid, transportation-related systems and the built environment.

Further, there is a long-felt unmet need to increase current grid resilience. There is a further long-felt unmet need to decarbonize the power delivered by current grids. Further, there is a long-felt unmet need to decrease the carbon intensity of the energy-consuming systems which are used to support the built environment.

There is a further long-felt unmet need to eliminate peaker plants. There is a further long-felt unmet need to decarbonize the generation resources which may be used to meet peak power load. There is a long-felt unmet further need to decarbonize the generation resources which may be used to meet intermediate power load. There is a long-felt unmet further need to decarbonize the generation resources which may be used to meet base power load.

Further, there is a long-felt unmet need to incorporate electricity generation systems into the grid, wherein the electricity generation systems are configured to increase current grid resilience. Further, there is a long-felt unmet need to incorporate electricity generation systems into the grid, wherein the electricity generation systems are configured to decrease the carbon intensity of electrical power and energy which is able to be delivered by the grid. Further, there is a long-felt unmet need to incorporate electricity generation systems into the grid, wherein the electricity generation systems are comprised of fuel cells located at grid edge.

Further, there is a long-felt unmet need to incorporate electricity generation systems into the grid, wherein the electricity generation systems comprise on-site hydrogen ("H2") systems which supply hydrogen to fuel cells providing power or ancillary services to the grid.

Further, there is a long-felt unmet need to incorporate electricity generation systems into the grid, wherein the electricity generation systems comprise on-site hydrogen storage systems operating at low pressure and which supply hydrogen to fuel cells providing power or ancillary services to the grid.

Further, there is a long-felt unmet need to incorporate electricity generation systems into the grid, wherein the electricity generation systems comprise on-site hydrogen generation systems which supply hydrogen at low pressure to fuel cells providing power or ancillary services to the grid.

Further, there is a long-felt unmet need to incorporate electricity generation systems into the grid, wherein the electricity generation systems comprise on-site hydrogen generation systems which supply hydrogen to fuel cells providing power or ancillary services to the grid, wherein the hydrogen is synthesized from sustainable feedstocks.

Further, there is a long-felt unmet need to improve load balancing that is available to current grids. There is a further long-felt unmet need to increase the amount of dispatchable distributed energy resources at grid edge. There is a further long-felt unmet need to increase participation in demand response programs run by utilities. There is a further long-felt unmet need to increase the duration of battery energy storage systems ("BESS"). There is a further long-felt unmet need to increase the available power which can be provided by vehicle-to-grid systems.

Further, there is a long-felt unmet need to increase the availability of fast DC charging for BEVs. There is a further long-felt unmet need to provide mobile fast DC charging for BEVs. There is a further long-felt unmet need to levelize power consumption from the grid at fast DC charging stations. There is a further long-felt unmet need to reduce power consumption from the grid that is required by fast DC charging stations.

There is a further long-felt unmet need to increase the amount of hydrogen which is used as a source of electrical power. There is a further long-felt unmet need to increase the number of generation resources which use hydrogen to produce electrical power. There is a further long-felt unmet need to increase the number of locations where hydrogen is used to produce electrical power. There is a further long-felt unmet need to increase the number of locations where hydrogen is available for dispensing to fuel cell electric vehicles.

PRIOR ART

Fuel cells ("FC") are well known in the art. There are several different types, of which PEM fuel cells powered by hydrogen are currently the most popular for mobile applications. Recently, fuel cell electric vehicles ("FCEV") have become commercially available in the United States and elsewhere. For example, Toyota has sold the PEM-based FCEV Mirai in the United States since 2015. For the Mirai from model years 2015-2019, the fuel cell stack provides 114 kw of power, and the hydrogen tanks store nearly 5 kg of hydrogen onboard at 700 bar of pressure. Tanks can be conveniently refilled in 5-10 minutes at hydrogen refueling stations. As of December of 2020, Toyota had sold over 6,000 of the Mirai FCEV in the United States. Considerable documentation about the technical specifications and performance of the Mirai FCEV is available in the public domain.

FIGS. 1A and 1B provide two depictions of certain aspects of the Mirai FCEV. FIG. 1A depicts a schematic of the fuel cell system for the Mirai (see Hiroyuki Yumiya, et al. Toyota Fuel Cell System (TFCS). World Electric Vehicle Journal, Vol. 7, 2015, pp. WEVJ7-0085 to WEVJ7-0092). FIG. 1B depicts a perspective view of the Mirai's drive train, fuel cell system and hydrogen tanks (see MY18 Mirai Fuel cell tech eBrochure. Accessed at https://www.toyota.com/content/ebrochure/2018/mirai_FuelCellTech.pdf on 2/28/2021).

DEFINITIONS

Battery electric vehicle ("BEV"): an electric vehicle which uses onboard batteries to store energy used to propel the vehicle. Electric power from the onboard batteries drives the electric motors that provide the vehicle with motive power. BEVs are prior art.

Built Environment: the set of buildings already in existence at a given time in a given geographic area.

Electric vehicle ("EV"): a vehicle having motive power provided by electric motors. The energy to power these electric motors can come from a variety of sources. EVs are prior art.

Fuel cell electric vehicle ("FCEV"): an electric vehicle which uses tank(s) of onboard hydrogen to store energy used to propel the vehicle. The hydrogen is used to generate electricity by means of an onboard fuel cell system. The electric power from the fuel cell drives the electric motors that provide the vehicle with motive power. FCEVs are prior art.

Metal hydride ("MH"): a hydride compound comprising at least one atom of hydrogen and at least one metal atom, wherein the metal atom is a member of any of Groups 1-12 on the periodic table of elements and has an atomic number of 3, 4, 11, 12, 19-30, 37-48 or 55-80.

Non-metal hydride ("NMH"): a hydride compound comprising at least one atom of hydrogen and at least one non-metal atom, wherein the non-metal atom is a member of any of Groups 13-16 on the periodic table of elements and has an atomic number of 5-8, 13-16, 31-34, 49-52 or 81-84.

Hydride material ("HM"): a mixture of hydride compounds comprising (i) a mixture of at least two different metal hydrides, (ii) a mixture of at least two different non-metal hydrides, or (iii) a mixture of at least one metal hydride and one non-metal hydride.

Mobile generation resource ("MGR"): a vehicle that has at least one onboard fuel cell stack which is configured to provide electric power for uses offboard of the vehicle.

Vehicle: A vehicle herein means any of a car, truck, bus or other terrestrial motor vehicle. A vehicle also may include railroad locomotives and other powered rail-based vehicles, as well as marine vessels (including boats, ships, barges and marine platforms) and aircraft (including propeller planes, jet aircraft, blimps, drones, short take-off and landing aircraft, vertical take-off and landing aircraft).

A vehicle further includes cargo-related platforms having no motive power of their own, comprising trailers configured to be towed by motor vehicles (including flatbed trailers, semi trailers, and other types of trailers), and rail cars and rail consists (alternatively, train consists) intended to be towed by railroad locomotives and other powered rail cars (including box cars, flatcars, covered hopper cars, gondolas, refrigerator cars, rail cars configured to transport intermodal equipment).

A vehicle further includes pallets, skids and shipping containers, appropriately configured to be transported and which may serve as part of a transportation system, a freight forwarding system, an freight system comprising intermodal containers, or a delivery system.

Plug-in hybrid electric vehicle ("PHEV"): a BEV that has a internal combustion engine electric and generator that together serve to charge an onboard battery. In addition to taking electric charge when parked, the onboard battery in a PHEV are also charged as needed by the engine/generator system while the vehicle is under way. PHEVs are prior art.

Refueling and docking station ("RDS"): A facility which provides a fuel (hydrogen, natural gas, methanol or other hydrogen-containing fuels) for use by an MGR or an FCEV. An RDS may further comprise connection points that enable the MGR to connect to balance of plant resources located at the RDS, which resources are thereby offboard of the MGR. An RDS may further comprise balance of plant devices which may support operation of systems which are onboard the MGR, the offboard devices at the RDS comprising devices providing fuel supply, air supply including compression, purification, etc., fuel cell exhaust processing, waste water processing, and fuel cell power take-off. An RDS may support one or more MGRs.

Proton exchange membrane ("PEM"): A component of specific type of fuel cell. The PEM is a semi-permeable membrane that conducts protons while acting as an electrical insulator and reactant barrier. Also known as polymer electrolyte membrane, PEMs are used in both fuel cells and electrolyzers. PEMs and PEM fuel cells are prior art.

Solid oxide fuel cell ("SOFC"): a specific type of fuel cell, wherein the fuel cell's electrolyte is a solid oxide or ceramic material. SOFC are prior art.

SUMMARY

Solutions to the problems noted above and others can be provided by MGRs and MGR-related technology as described in this application. Some aspects of MGRs and MGR-related technology are listed below.

The embodiments discussed below relate to the deployment of a plurality of fuel cells across a grid wherein the operation of the plurality fuel cells is carried out in a coordinated manner. The embodiments further relate to one or more fuel cells providing power to a grid. The embodiments further relate to one or more fuel cells providing ancillary services to a grid. The embodiments further relate to one or more fuel cells as component(s) of an MGR. The embodiments further relate to the operation of a plurality of MGRs at one or more RDSs. The embodiments further relate to the allocation of a plurality of MGRs across a plurality of RDSs.

The embodiments further relate to the operation of a plurality of MGRs, wherein the MGRs are comprised of one or more examples of a set of different classes of MGRS, wherein the set of different classes of MGRs comprise terrestrial motor vehicle-based MGRs, rail-based MGRs, marine vessel-based MGRs, aircraft-based MGRs, trailer-based MGRs, and pallet-based MGRs.

The embodiments further relate to the operation of a plurality of MGRs, wherein the MGRs are comprised of one or more examples of a set of different classes of MGRS, wherein the set of different classes of MGRs comprise MGRs having different types of FC (e.g., PEM FC, SOFC, etc.).

The embodiments further relate to the operation of a plurality of RDSs, wherein the RDSs are comprised of one or more examples of a set of different classes of RDSs, wherein the set of different classes of RDSs comprise RDSs having different types of stationary FC (e.g., PEM FC, SOFC, alkaline FC, etc.).

The embodiments further relate to the operation of a plurality of MGRs, wherein the MGRs are comprised of one or more examples of a set of different classes of MGRS, wherein the set of different classes of MGRs comprise MGRs having different types of reformer (e.g., methanol reformer, ethanol reformer, etc.).

The embodiments further relate to the operation of a plurality of MGRs, wherein the MGRs are comprised of one or more examples of a set of different classes of MGRS, wherein the set of different classes of MGRs comprise MGRs having different types of hydrogen storage (e.g., methanol storage, ethanol storage, metal hydrides, non-metal hydrides, hydride material, gaseous hydrogen tank storage, liquid hydrogen tank storage, etc.).

A further embodiment relates to a plurality of MGRs providing power to a grid while allocated across a plurality of RDSs.

A further embodiment relates to a plurality of MGRs providing power to a grid while allocated across a plurality of RDSs, wherein a carbon intensity of power provided by the MGRs is varied according to needs of a consumer of power, wherein a plurality of MGR fuel sources of varying carbon intensity are blended in accordance with a desired carbon intensity of the power.

A further embodiment relates to one or more MGRs docked at one or more of RDSs providing power across a grid in a coordinated fashion to one or more battery energy storage systems, the one or more battery energy storage systems located at positions which are remote from an RDS.

A further embodiment relates to one or more MGRs docked at one or more of RDSs providing power across a grid in a coordinated fashion to one or more electrical loads, the one or more one or more electrical loads located at positions which are remote from an RDS.

A further embodiment relates to one or more MGRs providing power to a customer premises while docked at an RDS.

A further embodiment relates to providing hydrogen generated at low pressure to MGRs.

A further embodiment relates to providing hydrogen stored in metal hydride-containing apparatus to MGRs.

A further embodiment comprises a plurality of MGRs which are allocated across a first RDS and a second RDS.

A further embodiment comprises a plurality of MGRs which are allocated across a a first RDS and a second RDS. At least one of the plurality of MGRs comprises a structural base, to which one or more fuel cell stacks are temporarily connected.

A further embodiment comprising at least one MGR, and further comprising at least two RDSs.

A further embodiment comprising at least one MGR, wherein the MGR is configured to provide power to the grid.

A further embodiment comprising at least one MGR, wherein the MGR is configured to provide power to the grid, wherein the MGR is a terrestrial motor vehicle, A further embodiment comprising at least one MGR, wherein the MGR is configured to provide power to the grid, wherein the MGR is a rail-based vehicle.

A further embodiment comprising at least one MGR, wherein the MGR is configured to provide power to the grid, wherein the MGR is a marine vessel.

A further embodiment comprising at least one MGR, wherein the MGR is configured to provide power to the grid, wherein the MGR is an aircraft.

A further embodiment comprising at least one MGR, wherein the MGR is configured to provide power to the grid, wherein the MGR is a vehicle having no motive power of its own.

A further embodiment comprising at least one MGR, wherein the MGR is configured to provide power to the grid, wherein the MGR is a pallet or other instrumentality appropriately configured to be transported.

A further embodiment comprising at least one MGR, wherein the MGR is configured to provide demand response services to the grid.

A further embodiment comprising at least one RDS, wherein the RDS is configured to provide demand response services to the grid.

A further embodiment comprising at least one MGR, wherein the MGR is configured to provide ancillary services to the grid.

A further embodiment comprising at least one MGR, wherein the MGR is configured to provide ancillary services to the grid, wherein the MGR is a rail-based vehicle.

A further embodiment comprising at least one MGR, wherein the MGR is configured to provide ancillary services to the grid, wherein the MGR is a marine vessel.

A further embodiment comprising at least one MGR configured to provide mobile fast DC charging.

A further embodiment comprising at least one MGR, wherein the MGR is configured to provide power or ancillary services to the grid, and to provide power for mobile fast DC charging.

A further embodiment providing mobile fast DC charging, wherein the MGR is a terrestrial motor vehicle, a rail-based vehicle, a marine vessel, an aircraft, a vehicle having no motive power of its own, or a pallet or other instrumentality appropriately configured to be transported.

A further embodiment comprises a plurality of MGRs which are allocated across a first RDS and a second RDS, wherein power from the RDS is provided to a fast DC charging facility.

A further embodiment providing an app to match requests for fast DC charging service with MGRs providing fast DC charging service.

A further embodiment levelizing power demand at stationary fast DC charging stations.

A further embodiment integrating mobile and stationary fast DC charging.

A further embodiment providing an MGR configured to provide ride sharing and mobile fast DC charging.

The embodiments further relate to computer systems that coordinate the operation of a plurality of fuel cells deployed across a grid. The embodiments further relate to computer systems that coordinate the operation of balance of plant apparatus used to support the operation of the plurality of fuel cells. The embodiments further relate to computer programs that analyze the allocation of a plurality of MGRs across a plurality of RDSs.

The embodiments further relate to computer systems that coordinate the operation of a plurality of MGRs across a plurality of RDSs with the operation of computer system comprising a virtual power plant.

The embodiments further relate to computer systems that coordinate the operation of a plurality of MGRs across a plurality of RDSs with the operation of a computer system comprising a distributed energy resource management system.

The embodiments further relate to computer systems that analyze the allocation of a plurality of MGRs across a plurality of RDSs.

The embodiments further relate to methods by which an allocation of a plurality of MGRs may be provided across a plurality of RDS.

The embodiments further relate to methods by which an allocation of a plurality of MGRs may increase the resilience of power provide by a utility.

For example, MGRs can provide DC fast charging services to BEVs and PHEVs at any location where two vehicles can park together. EV charging is thereby no longer limited to DC fast charging stations located at fixed geographic positions (most EV charging stations draw power from the local electric grid). Freeing EVs from this requirement allows EVs to obtain additional charge as is convenient to the EV user. Additionally, MGRs and MGR-related technology can address consumer concerns that EV range is insufficient, that EV charging is inconvenient due to long wait and/or charge times, and other perceived battery-related shortcomings of EVs.

MGRs and MGR-related technology may also obviate the economically less efficient approach of constructing charging stations at locations where investment returns may be low. Decoupling EV charging from fixed location charging facilities can be accomplished by using MGRs and MGR-related technology in various combinations, including (i) fleets of MGRs, (ii) a plurality of RDSs, (iii) MGR computer systems that provide for scheduling and dispatch of MGRs to consumer EVs in need of charging ("MGR CSs"), (iv) EV-based computer systems ("EV CSs") for consumer EVs that enable communication with MGR CSs, (v) MGR smartphone applications ("MGR app") capable of monitoring MGR function and communicating with the MGR CS, (vi) EV owner smartphone applications ("EV apps", including any/all computer software capable of executing on smartphones, tablets, desktop computers, etc.) that enable EV owners to communicate with MGR CSs and EV CSs, (vii) adaptations, configurations and modifications to EVs which improve the convenience and efficiency with which MGRs can provide charging services to such EVs.

MGRs and MGR-related technology may improve EV charging by providing charge to EVs as is convenient or necessary, where the charging is decoupled from fixed location EV charging, and where the electricity provided to a given EV may be derived from electricity generated by a renewable resource such as wind or solar generation, biomass-based fuels, etc. Alternatively, the electricity used to recharge EVs using such technology may be derived from fossil fuels where it may be economically advantageous to use fossil fuels instead of renewable energy. Blockchain technology may be used in combination with MGRs and MGR-related technology to administer the extent to which such charging is provided by zero carbon or partly-decarbonized power.

MGRs and MGR-related technology may also be used to improve grid resilience and reduce the carbon content of power available through the grid by directing low- or zero-carbon power generated by MGRs to the grid while they are docked at RDSs.

MGRs and MGR-related technology may improve EV users' ability to choose from competing electricity providers, where an EV user's ability to choose a charging provider ("CP") is based on various market-based factors, such factors including but not limited to (i) details of the pricing plan for charge provided by the CP, including the availability of hedging- and futures-related aspects (of interest for EV fleet owners); (ii) geographic scope of the CP; (iii) hours of operation of the CP; (iv) carbon content of the energy resources that can be provided by the CP; (v) range of charging speeds provided by the CP; and (vi) flexibility of plans provided by the CP with respect to technology specifics of EV brand, EV charging connection standard (e.g., CCS, Tesla, etc.), battery technology, etc.

A further benefit of MGRs and MGR-related technology comprises EV users using EV apps to create profiles that describe the physical and electrical parameters of their EV(s), charge scheduling preferences, fuel source preferences, fuel price preferences, and battery management preferences. EV users can also use EV apps to communicate with their EV and one/many MGR CS(s) in the course of managing the status of their EV battery.

A further benefit of MGRs and MGR-related technology comprises EV users scheduling charging sessions according to convenience, regardless of whether they are driving or parked. Optionally, EV users can forgo making charging decisions at all by specifying a preference to their EV app that the MGR CS schedule and direct that charging sessions be executed during periods where the MGR CS detects that the EV is available for charging.

A further benefit of MGRs and MGR-related technology comprises improving EV battery life by suggesting scheduling of charging sessions to EV owners that result in minimum battery degradation.

A further benefit of MGRs and MGR-related technology comprises providing EV owners with control over charging speed, electricity pricing and carbon impact.

A further benefit of MGRs and MGR-related technology comprises optimizing the scheduling and dispatching of individual MGRs from within an MGR fleet in light of the demands of a fleet of EVs lodging requests for charging services to the one or more MGR CSs, to which MGR CSs an MGR fleet may look for charging opportunities. Methods for optimizing the scheduling and dispatching of a fleet of MGRs that may provide charging services for a fleet of EVs include genetic algorithms, heuristic approaches, neural networks, constraint programs, and other analogous methods. These methods are used in determining solutions to combinatorially explosive problems such as those posed by an MGR-EV scheduling and dispatching system. Numerous techniques to embody these methods are well known in the art (see, e.g., E. L. Lawler, et al. (1985), The Traveling Salesman Problem: A Guided Tour of Combinatorial Optimization, John Wiley & Sons, ISBN 0-471-90413-9.

A further benefit of MGRs and MGR-related technology comprises using artificial intelligence technology and algorithms to identify EV charging patterns (whether as individual EVs or groups of EVs), where such charging patterns may provide information that is advantageous to aspects of EV charging (pricing, scheduling, routing, etc.) by MGR fleets, charging networks and utilities;

A further benefit of MGRs and MGR-related technology comprises reducing utility load by acting as a method of demand response, wherein MGRs and MGR-related technology supplement utility supply of power charge to EVs and other loads in a coordinated fashion.

A further benefit of MGRs and MGR-related technology comprises (i) providing utilities with information and data that is useful in predicting future trends in real-time and long-term energy use, the information and data relating to EV charging activity, including MGR- and fixed-location charging, and (ii) providing utilities with interfaces to an MGR computer system having substantial information concerning EV charging patterns (i.e., when, where, and how much electricity), thereby allowing utilities to defer or entirely avoid costly infrastructure upgrades;

A further benefit of MGRs and MGR-related technology comprises providing municipalities with information and data that is useful in in planning for the changes anticipated to occur throughout the municipalities from the transition from ICE-based vehicles to EVs. This may be accomplished by using portals to MGR CSs that provide municipalities with information that is relevant to on-street charging and parking lot charging.

A further benefit of MGRs and MGR-related technology is providing charging capability to all spaces in parking facilities, where only a fraction of the parking spaces may be occupied by EVs.

A further benefit of MGR-related technologies allows parking facilities to improve their ability to provide EV charging by using portals to a MGR system, such portals providing them with charging functionality they can integrate with their space metering system.

DETAILED DESCRIPTION

Figure 1A:
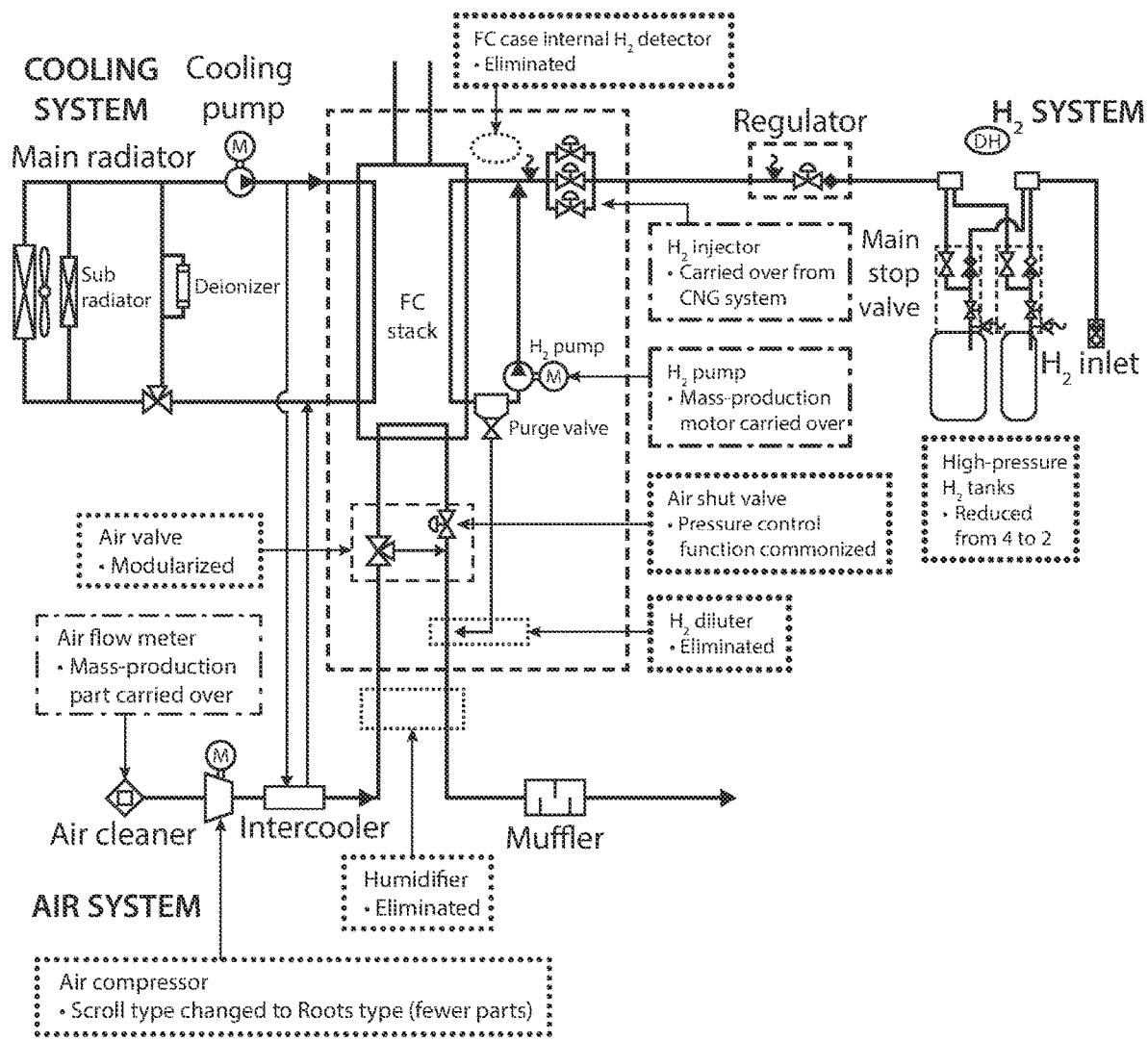
FIG. 1A depicts an aspect of a Toyota Mirai, a prior art fuel cell electric vehicle.
Figure 1B:
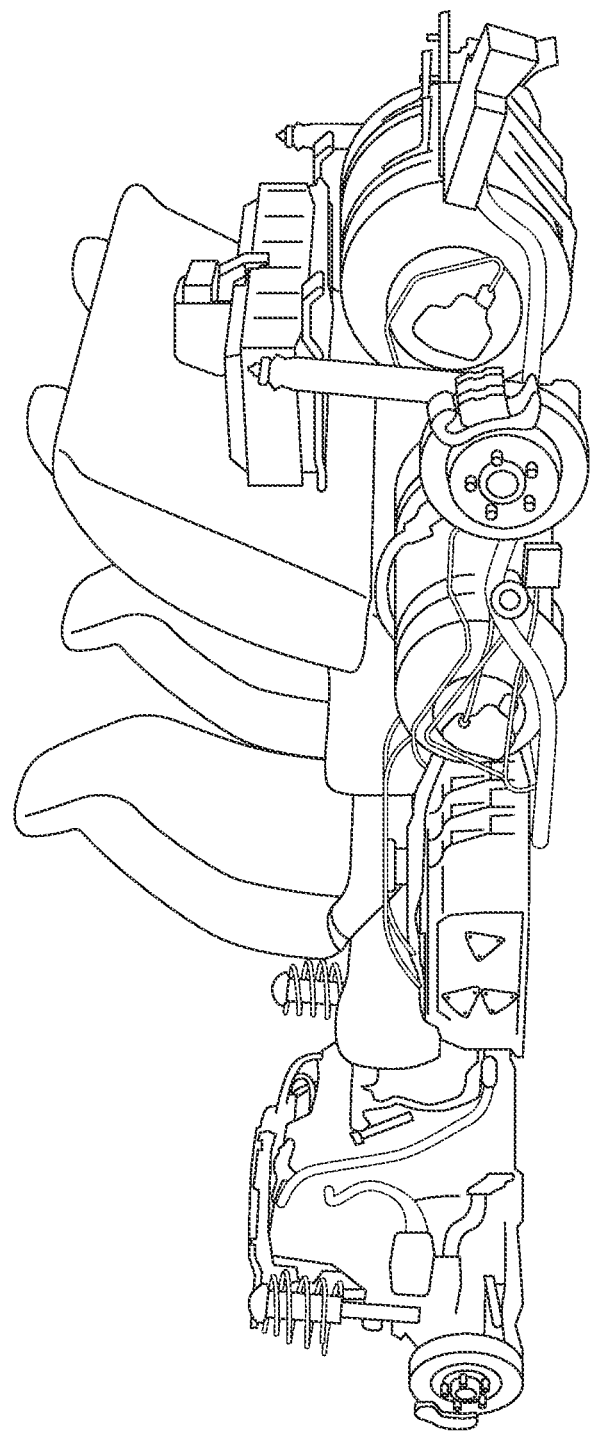
FIG. 1B depicts another aspect of the Toyota Mirai, a prior art fuel cell electric vehicle.
Figure 2A:
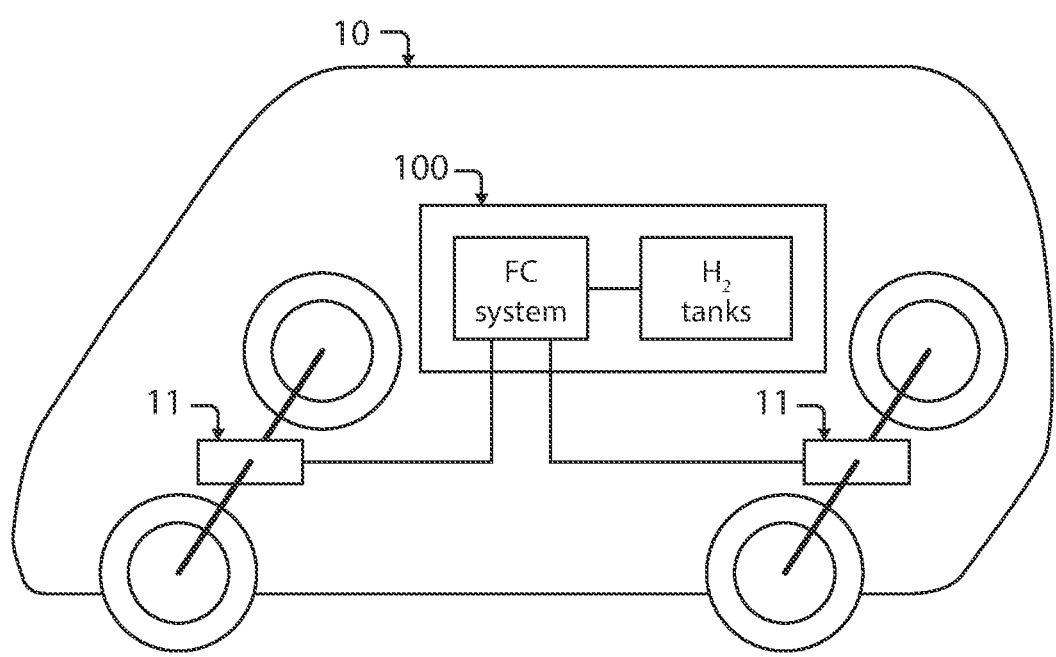
FIG. 2A depicts a schematic of an embodiment of an MGR.

FIG. 2A depicts certain details of MGR 10. The MGR 10 may be comprised of an electric motor vehicle comprising traction-providing electric motors 11. The MGR 10 also comprises a fuel cell-based power generation system 100 that serves to provide power to electric motors 11, and other capacitive, resistive or inductive loads that may be comprised of the electrical system of the MGR 10. The fuel cell-based power generation system 100 may also serve (i) to provide electric charging services to EVs, (ii) to provide electric power to stationary loads such as EV charging stations, microgrids, battery-based energy storage systems, utility substations, etc., and (iiii) to provide ancillary services to utility substations, grid transmission facilities, etc.

An MGR may be used when it is mobile, that is, when it provides power to offboard loads by its own systems alone. Alternatively, an MGR may be used when it is stationary, wherein the MGR may provide power to offboard loads when its onboard systems are connected to additional stationary apparatus, with the stationary apparatus configured to communicate with the onboard systems of the MGR. Further, an MGR may be configured to be operable only in a mobile context, only in a stationary context, or in both mobile and stationary contexts.

Figure 2B:
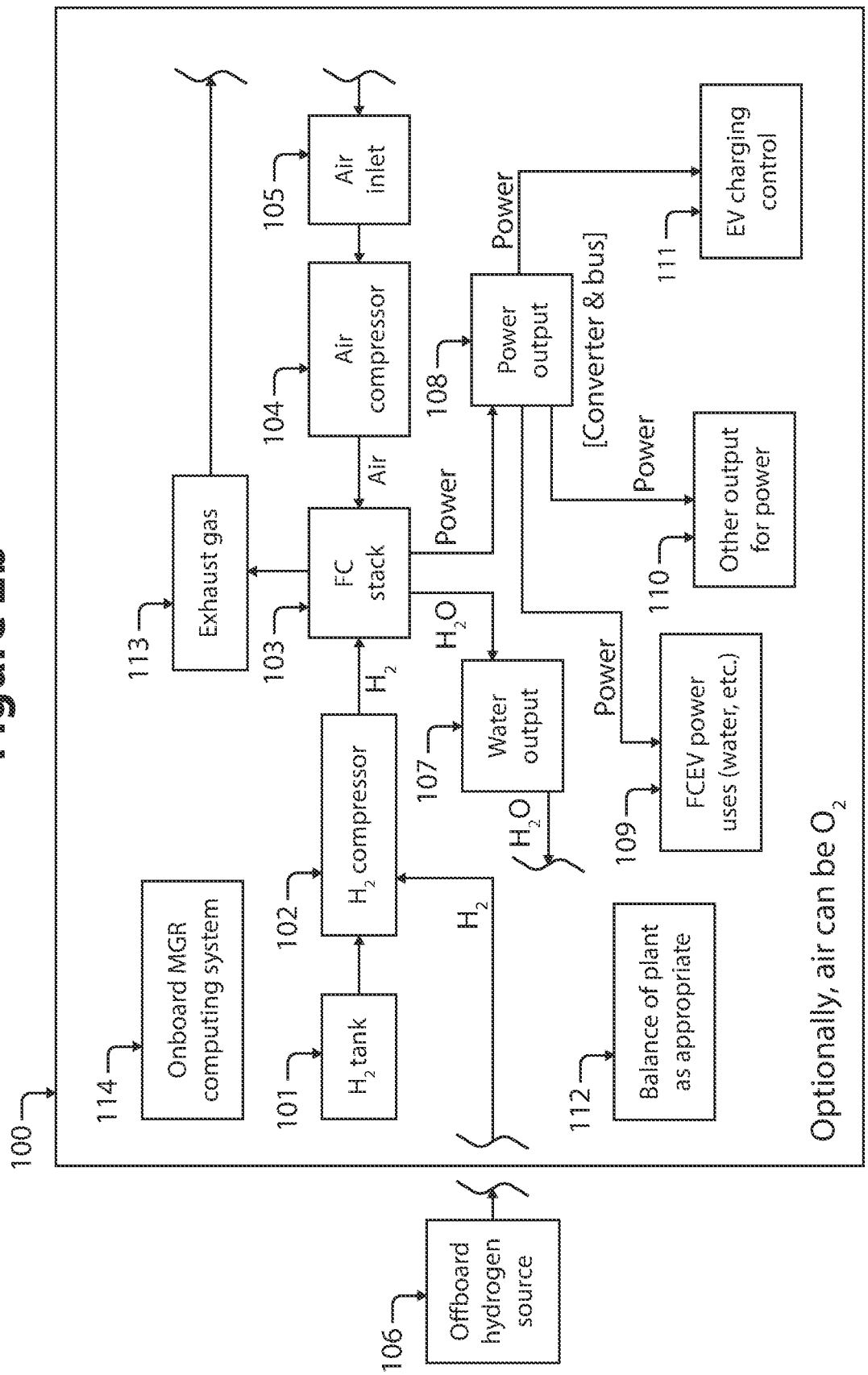
FIG. 2B depicts a schematic of another embodiment of an MGR.

FIG. 2B depicts certain details of MGR 10 that relate to the FC-based power generation system 100. FC stack 103 may be supplied with hydrogen from a hydrogen compressor 102. Preferably, FC stack 103 may be a PEM-type fuel cell. In turn, hydrogen compressor 102 may be supplied by hydrogen from onboard hydrogen storage 101. Hydrogen contained in onboard hydrogen storage 101 may be preferably stored at high pressure, preferably 350-700 bars, and may be supplied in the same manner as may be used for prior art FCEVs.

Further, in this application, where hydrogen is described as high pressure or low pressure, any numeric values that are given are illustrative.

Alternatively, the hydrogen compressor 102 may be supplied with hydrogen by a connection to an offboard hydrogen source 106, where the pressure of the incoming hydrogen is preferably at least 0.1 bar but less than 350 bars, i.e., less than is preferred for onboard hydrogen storage 101. The lower pressure of an offboard hydrogen source 106 may reflect characteristics of the hydrogen source, which may in turn reflect that the supply is provided by a pipeline, by on-site renewable electricity-generation with electrolyzer, or by on-site steam reformation of methane supplied as natural gas by a local utility. Such a source would be effectively uninterruptible, since the electricity provided by the fuel cell-based power generation system 100 would not be limited to the hydrogen in a finite sized tank.

Preferably, the MGR 10 will use the offboard hydrogen source 106 when it is stationary. Benefits of operating the MGR when stationary comprise at least (i) minimizing vibration and shock, thereby increasing fuel cell stack life; (i) duration of H2 supply; and (iii) resilience of the hydrogen supply.

Resilience of the hydrogen supply to MGR 10 may be increased by using multiple independent methods of supply, for example, using (i) on-site steam reformation of natural gas to produce hydrogen, (ii) on-site reformation of methanol, (iii) on-site electrolysis of water, (iv) pipeline supply of hydrogen or methane-containing gas, and (v) on-site high volume, low-pressure storage of hydrogen, e.g., salt domes.

Further to FIG. 2B, the fuel cell stack is also supplied with air (or other gases or gas mixtures as appropriate to the needs of the fuel cell stacks that are being supplied) by an air compressor 104. Air inlet 105 may also perform particle filtration and other functions for air compressor 104. Additionally, air compressor 104 and air inlet 105 may provide an oxygen-enriched gaseous mixture.

Further to FIG. 2B, outputs of fuel cell stack 103 include waste water and power. Fuel cell stack 103 sends waste water to water output 107, and power generated by operation of FC stack 103 is sent to power output 108. Further to power output 108, power is directed in appropriate amounts and at appropriate times to (i) other loads within the MGR 109, (ii) other output for power 110, and (iii) EV charging control 111. EV charging control 111 includes a cable and charging head configured to provide a DC connection to a BEV, whereby the BEV may receive electric charge generated by fuel cell stack 103.

Further to FIG. 2B, exhaust gas output 113 manages transfer of exhaust gases from fuel cell stack 103 to the atmosphere.

Further to FIG. 2B, additional balance of plant 112 as appropriate to the embodiment is included. For example, balance of plant 112 may include a cooling system, exhaust gas recycling, and/or a voltage boost converter such as is used in the Toyota Mirai FCEV.

Further to FIG. 2B, all of FC stack 103, hydrogen compressor 102, onboard hydrogen storage 101, offboard hydrogen source 106, air compressor 104, air inlet 105, water output 107, power output 108, other loads within the MGR 109, other output for power 110, EV charging control 111, balance of plant 112 and exhaust gas output 113 may comprise appropriate sensors, digital and analog circuitry, and respective connections to related control and communication lines as appropriate to the embodiment. Such additional apparatus are operatively connected to onboard MGR computing system 114.

Further to FIG. 2B, it is preferred that hydrogen be supplied to MGR 10 by a docking area such as MGR Dock 401, as disclosed at FIG. 4A and the related text below. Providing hydrogen supply at a docking station is advantageous, as it combines facilities (i) to fuel onboard hydrogen storage 101 with high pressure hydrogen when MGR 10 is to be used to provide mobile EV charging through EV charging control 111, and (ii) to supply low-pressure hydrogen when power output 108 is to be directed to other output for power 110. See FIGS. 4A-4F and related text for illustrative uses that could be supplied by power output 108.

Figure 3A:
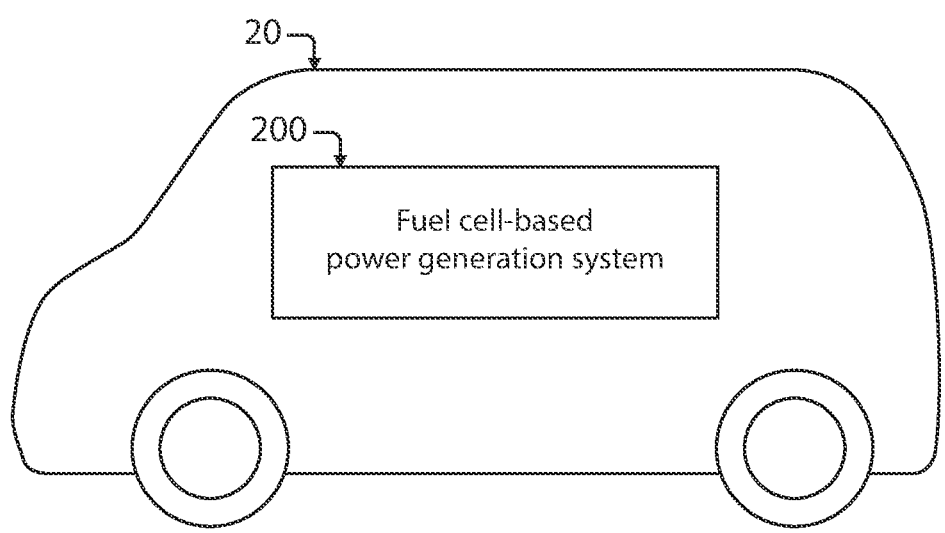
FIG. 3A depicts a schematic of an embodiment of an MGR.
Figure 3B:
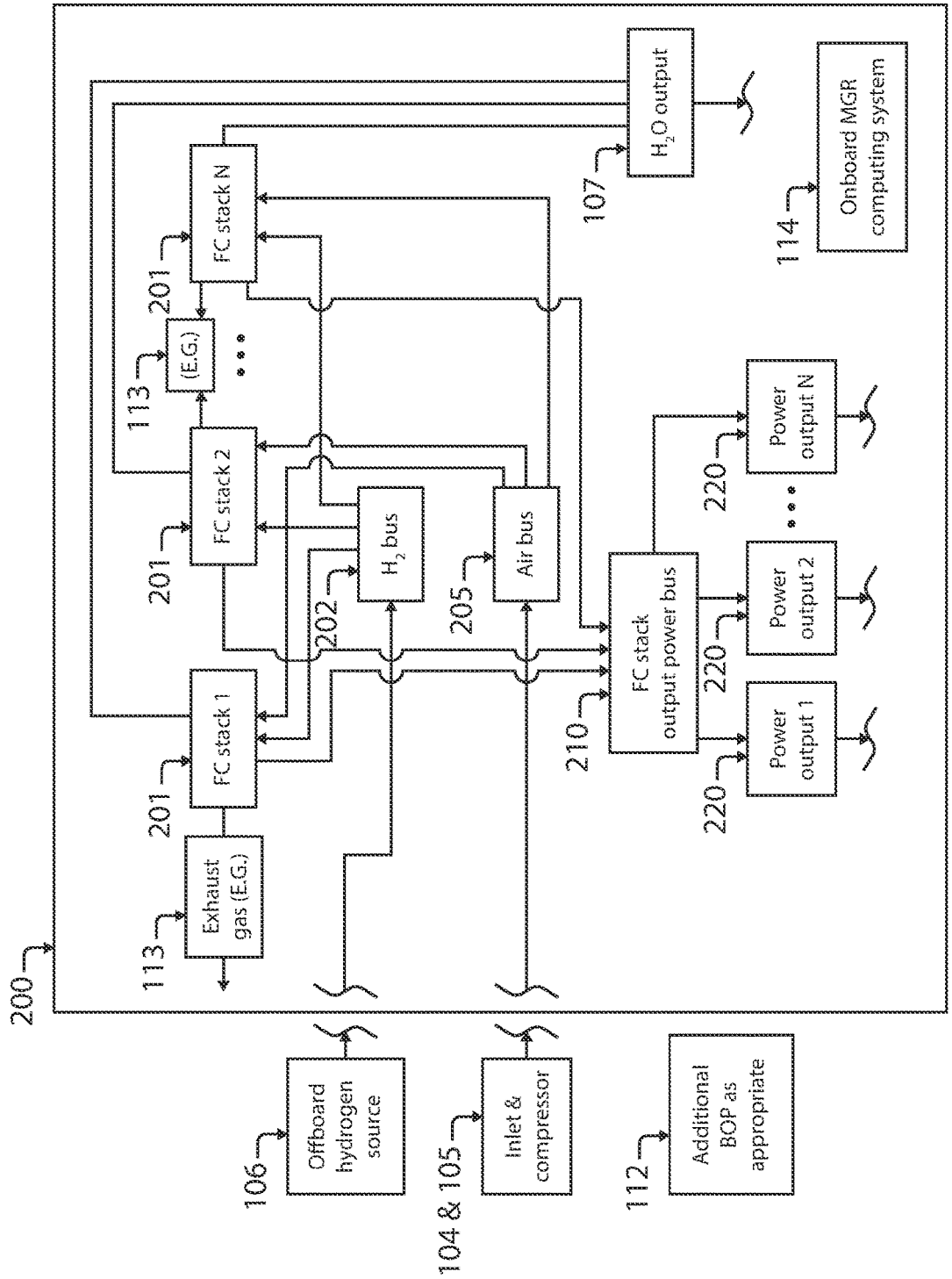
FIG. 3B depicts a schematic of another embodiment of an MGR.

FIG. 3B depicts certain details of MGR 20. MGR 20 may be comprised of a vehicle with substantial cargo volume. Further, MGR 20 may be an electric motor vehicle. MGR 20 comprises a fuel cell-based power generation system 200 that serves to provide electric power to a variety of capacitive, resistive or inductive loads which are offboard of MGR 20, including (i) providing electric charging services to EVs, (ii) providing electric power to stationary loads such as EV charging stations, microgrids, battery-based energy storage systems, utility substations, etc., and (iiii) providing power and ancillary services to utility substations, grid transmission facilities, etc.

FIG. 3B depicts certain details of MGR 20 that relate to the fuel cell-based power generation system 200. Fuel cell-based power generation system 200 includes a plurality of fuel cell stacks 201. Each of the plurality of fuel cell stacks 201 is supplied with hydrogen from a hydrogen bus 202. The hydrogen bus 202 is in turn supplied with hydrogen by an offboard hydrogen source 106.

Hydrogen bus 202 provides hydrogen to each of the plurality of fuel cell stacks 201 based on the needs of each individual fuel cell stack 201. In addition to distributing the flow of hydrogen provided by offboard hydrogen source 106 to fuel cell stacks 201, hydrogen bus 202 may include additional functionality, such as compression, metering, etc.

Additionally, each of the plurality of fuel cell stacks 201 is supplied with air from an air bus 205. The air bus 205 is in turn supplied with air from an air compressor 104 and air intake 105.

Air bus 205 provides air to each of the plurality of fuel cell stacks 201 based on the needs of each individual fuel cell stack 201. In addition to distributing the flow of air provided by air compressor 104 and air intake 105 to fuel cell stack 201s, air bus 205 may include additional functionality, such as compression, filtering, metering, etc.

Further to FIG. 3B, power output from fuel cell stacks 201 is directed to fuel cell stack output power bus 210. In turn, the aggregated power at fuel cell stack output power bus 210 is directed to uses offboard of MGR 20 via a plurality of power outputs 220. Both of fuel cell stack output power bus 210 and power outputs 220 may include apparatus to appropriately regulate the flow of electric power that is required by the offboard uses that are supplied by MGR 20. Illustrative uses are noted above, in connection with discussion of FIG. 3B.

Alternatively, a single fuel cell stack 103, or a single fuel cell stack 201 may be used with a plurality of power outputs 220. Alternatively, a plurality of fuel cell stacks 103 may be used with a single power output 220.

Further to FIG. 3B, outputs of fuel cell stacks 201 include waste water. Fuel cell stacks 201 send waste water to water output 107. Additionally, exhaust gas output 113 manages transfer of exhaust gases from fuel cell stacks 201 to the atmosphere.

Further to FIG. 3B, additional balance of plant 112 as appropriate to the embodiment is included, as discussed above in connection with FIG. 2B.

Further to FIG. 3B, all of fuel cell stacks 201, hydrogen bus 202, offboard hydrogen source 106, air bus 205, air compressor 104, air intake 105, water output 107, fuel cell stack output power bus 210, power outputs 220, additional balance of plant 112 and exhaust gas output 113 may comprise appropriate sensors, digital and analog circuitry, and respective connections to related control and communication lines as appropriate to the embodiment. Such additional apparatus are operatively connected to onboard MGR computing system 114.

Further to FIGS. 2B and 3B, real-time streamed data, and/or time-averaged values of real-time data (i.e., a series of values, where each value is the average of a time series sampled at a specified rate over a set period, e.g., a series of component temperatures as measured by a temperature sensor, where each value in the series is the average of sixty measurements taken over a period of 60 seconds) and other data pertaining to elements identified in FIGS. 2B and 3B are received by an onboard MGR computing system 114, and used by the MGR operating system and software modules thereof to monitor, operate and maintain the fuel cell-based power generation systems 100 or 200.

For example, real-time streamed measurements of the following two items may be monitored, which the MGR computing system 114 may use to calculate efficiency of the fuel cell stack 103 or 201 over a given period: (i) output power of the fuel cell stack 103 or 201, and (ii) flow rate of hydrogen supplied by hydrogen compressor 102 or hydrogen bus 202 to fuel cell stack 103 or 201. Additionally, total power requirements of all loads within the fuel cell-based power generation system 100 or 200 may be summed and subtracted from the output power of the fuel cell stack 103 or 201 to calculate net power produced by the fuel cell-based power generation system 100 or 200. Other illustrative specific data include fuel cell stack performance parameters such as voltage and amperage, hydrogen tank level, hydrogen flow rate, composition of exhaust gases, waste water composition, waste water flow rate, hydrogen inlet pressure and flow rate at the fuel cell stack, and other information as is known in the art.

Further to FIG. 3B, certain aspects of fuel cell-based power generation system 200 may be advantageously not permanently installed onboard an MGR 20. For example, MGR 20 may be configured so as to have available room and appropriate connections for additional equipment, with MGR 20 configured to have an onboard hydrogen tank, additional hydrogen compression equipment and additional air compression equipment onboard. This configuration would allow MGR 20 to provide mobile service for EV charging, grid support, etc. at locations where there is no offboard hydrogen supply. Other examples of "plug-an-play" components may include fuel cell stacks, air handling equipment, etc.

Additionally, it may be advantageous to include temporarily installed hydrogen-reforming equipment on an MGR, thereby providing functionality to connect the MGR to a fuel source other than gaseous or liquid hydrogen (e.g., natural gas, methanol, ammonia, etc.).

Alternatively, an MGR 20 might be configured to have the substantial majority of the fuel cell system permanently offboard. For example, an MGR 20 could be configured so that hydrogen bus 202, offboard hydrogen source 106, air bus 205, air compressor 104, air intake 105, water output 107, fuel cell stack output power bus 210, power outputs 220 and additional balance of plant 112 are all offboard, while leaving onboard appropriate connections to move gas, fluid or power, and lines for control and communications. This would allow for an accordingly larger number of fuel cell stacks 201 onboard. Such a configuration would be advantageous as it would maximize the amount of power that a single MGR 20 may produce, provided the appropriate supporting systems are available at locations where MGR 20 is deployed. This would be advantageous in an area where electric power needs vary substantially over time, i.e., a geographic area where electric loads and local grid configurations may have a larger benefit from a small number of high-powered MGRs instead of a larger number of moderately-powered MGRs. An additional advantage may be obtained in that an offboard location for equipment obviates the need to minimize volume and mass of that equipment, which may provide cost and performance advantages for the system overall.

Another advantage may be obtained when configuring a fleet of MGRs for deployment in considering the power and other characteristics of each MGR to be included in the fleet. For example, it may be advantageous to have a fleet where all MGRs possess roughly equivalent functional profiles. Alternatively, it may be advantageous for a fleet of MGRs to have a heterogenous distribution of functional profiles. For example, an illustrative fleet may have a bi-modal distribution of functional profiles, where one subset of the fleet has on-board hydrogen storage, but is relatively low-powered (e.g., approximately 100 kw per MGR), and the other subset has little or no on-board hydrogen storage but is relatively high-powered (e.g., approximately 400 kw per MGR).

Further to FIGS. 2B and 3B, it is preferred that hydrogen be supplied to MGR 10 or MGR 20 by a docking area such as MGR Dock 401 or MGR Dock 402, as disclosed below. Providing hydrogen supply at a docking station is advantageous, as it combines facilities (i) to fuel onboard hydrogen storage 101 with high pressure hydrogen when MGR 10 is to be used to provide mobile EV charging through EV charging control 111, and (ii) to supply low-pressure hydrogen when (a) power output 108 is to be directed to other output for power 110, or (b) fuel cell stack power output bus 210 is to be directed power outputs 220. See below for illustrative uses.

Figure 4A:
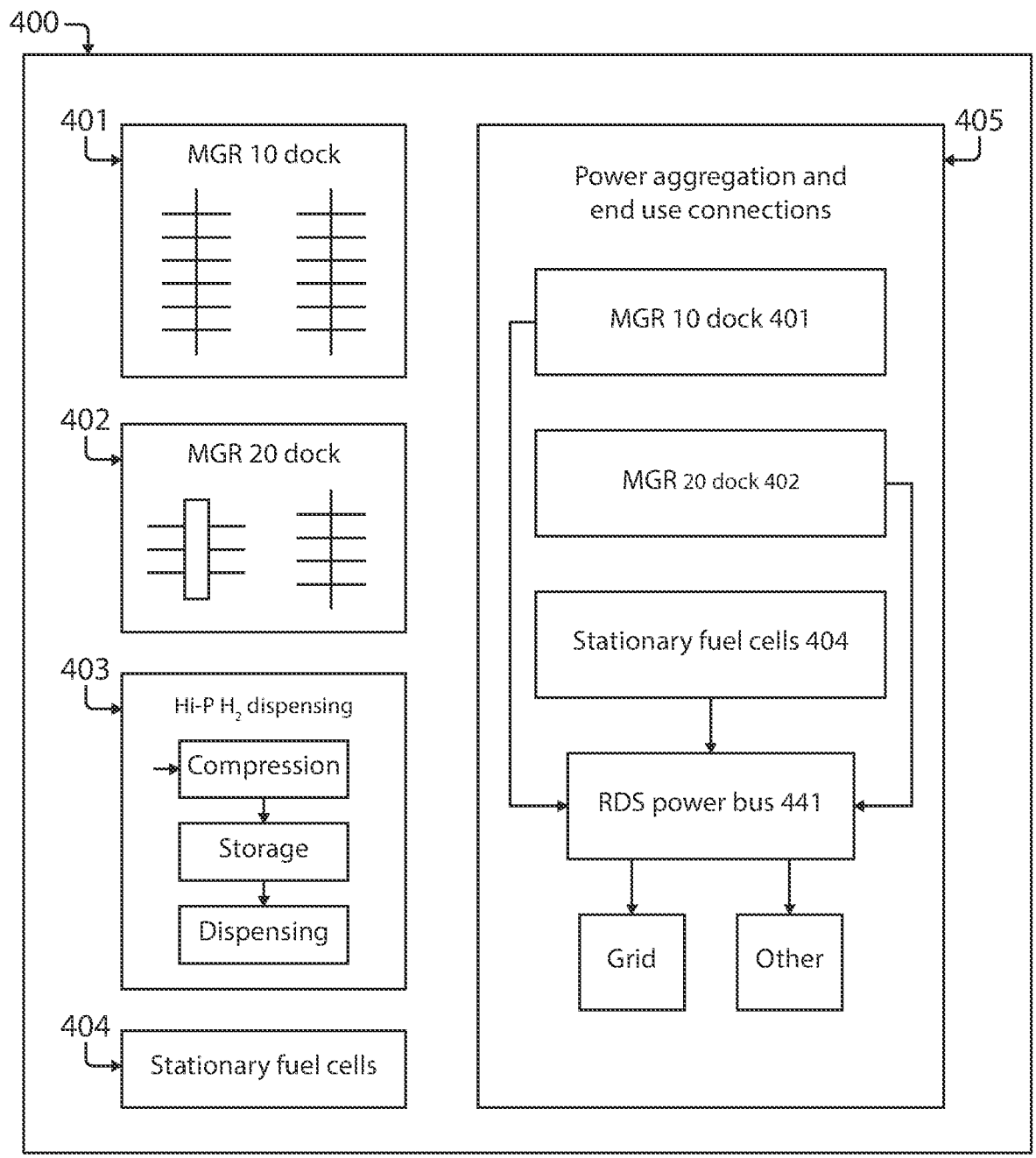
FIG. 4A depicts a schematic of certain aspects of an embodiment of an RDS.

FIG. 4A comprises a set of depictions which relate to functions that can be provided by a refueling and docking station 400, hereinafter RDS 400. These functions comprise (i) providing space for MGR parking and (ii) providing certain connections between MGRs and apparatus which may be present at RDS 400. Hereinafter, when provided together, parking and connection are referred to as "docking". Parking can be provided in open parking lots, semi-enclosed parking garages, basement parking facilities, etc. Connections that are provided to parked MGRs relate to (i) hydrogen supply provided to parked MGRs, (ii) power to be received from parked MGRs, and (iii) other functions attendant to operation of the parked MGRs. For example, MGR Dock 401 depicts a docking area for MGRs such as MGR 10. Alternatively, MGR Dock 402 depicts a docking area for MGRs such as MGR 20.

Further to FIG. 4A, another function of RDS 400 is to provide high-pressure hydrogen dispensing facility 403, which depicts a facility that is capable of refueling hydrogen-consuming FCEVs and MGRs. Preferably, high-pressure hydrogen dispensing facility 403 is capable of dispensing hydrogen at rates of at least 0.1 kg per minute to an FCEV or MGR. Typically, the hydrogen dispensed at such facilities is stored and dispensed at approximately 700 bars. Examples of such facilities have been installed at over 40 locations in California; these retail hydrogen stations provide refueling for FCEVs in a short time, depending on the size of the hydrogen tank. Typically, such stations are able to provide 5 kg of hydrogen in 5 to 10 minutes. Preferably, high-pressure hydrogen dispensing facility 403 will include equipment to compress hydrogen to high pressure, store it at high pressure, and dispense it to FCEVs and MGRs which have onboard tanks to contain hydrogen at high pressure.

Further to FIG. 4A, stationary fuel cell facility 404 depicts a facility comprising at least one stationary fuel cell system. Such a system may comprise a PEM fuel cell(s), a solid oxide fuel cell(s), or other types of fuel cells known in the art.

Further to FIG. 4A, power aggregation and end use connections 405 depicts an apparatus capable of managing the power output from MGR docking facilities, for example MGR Dock 401 or MGR Dock 402, and stationary fuel cell facility 404. Power aggregation and end use connections 405 is connected to power output from one or more MGR docking facilities and stationary fuel cell facility 404, with power from those facilities controlled by an RDS power bus, and further transmitted to the local grid or other end users.

Further to FIG. 4A, not all of the systems enumerated in FIG. 4A need be present in order for the facility to be an RDS. Per the definition of an RDS above, the only two functions that a facility must perform in order to comprise an RDS are (i) the facility provides an operable connection to receive power from at least one MGR, and (ii) the facility provides an operable connection to provide hydrogen (or other hydrogen-containing fuel) to at least one MGR or FCEV. Both connections need not be used at the same time, or by the same MGR.

Figure 4B:
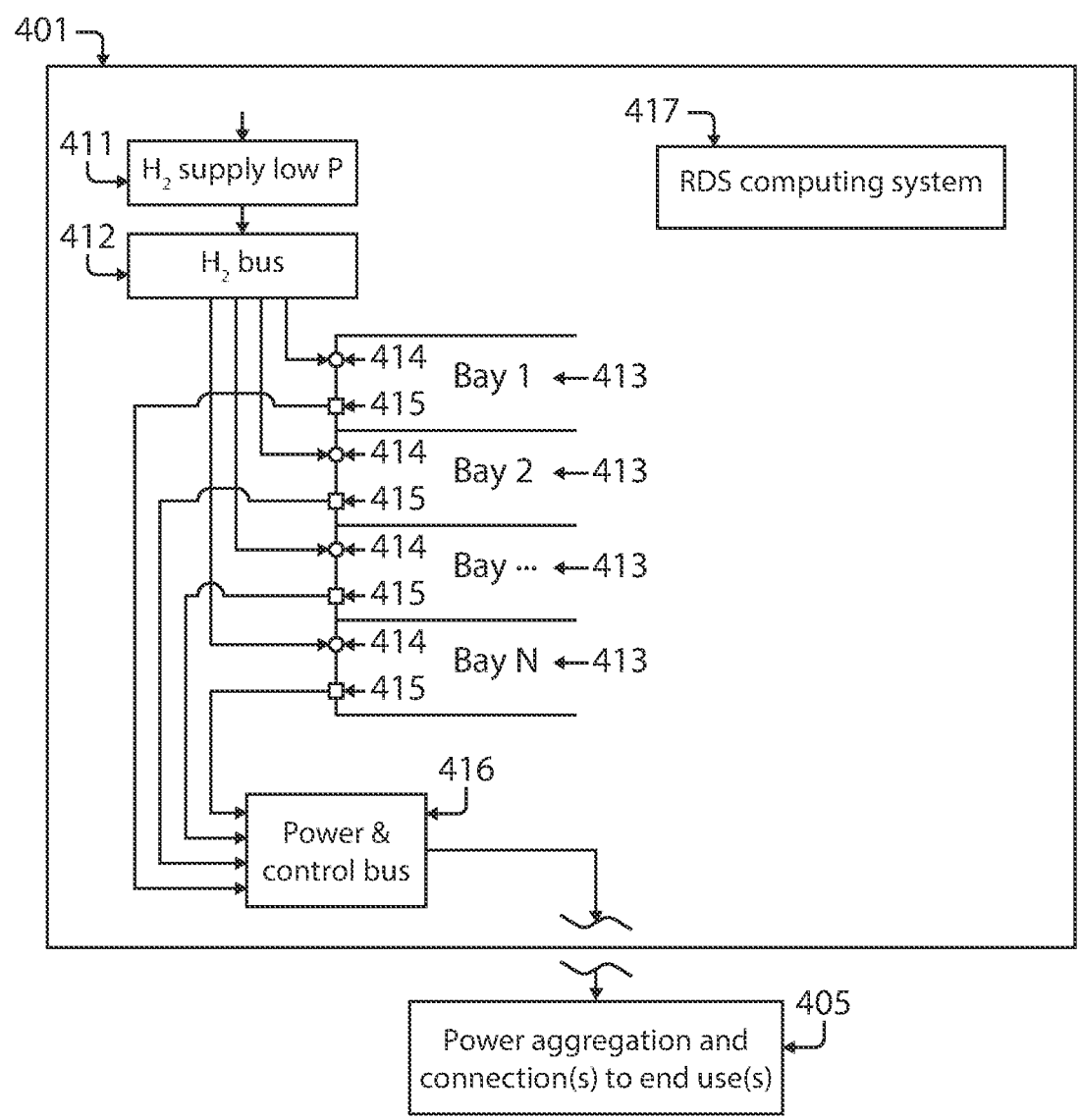
FIG. 4B depicts a schematic of an embodiment of parking and docking for a plurality of MGRs.

FIG. 4B depicts a MGR Dock 401, a docking area for MGRs, for example MGR 10. MGR Dock 401 comprises one or more parking locations MGR bay(s) 413. Preferably, the respective MGR bays 413 are uniquely and systematically identified. More preferably, identification can comprise both GPS coordinates and a unique digital identifier. Each MGR bay 413 may also include a hydrogen connection point 414 and a power take-off connection point 415, each of which has operatively configured hardware for connection to the docked MGR. Hydrogen connection point 414 may supply hydrogen to an MGR docked at MGR bay 413. Further, hydrogen connection point 414 may receive hydrogen to an MGR docked at MGR bay 413.

Further to FIG. 4B, hydrogen supply 411 provides hydrogen for use by MGRs at a relatively low pressure, e.g., between 1 and 350 bars. Hydrogen supply 411 is connected to hydrogen bus 412. Hydrogen bus 412 regulates the pressure of hydrogen in each line leading to respective MGR bay(s) 413, with hydrogen lines directed to respective hydrogen connection points 414 where docked MGR 10s may be connected. Additionally, hydrogen bus 412 may also perform gas purification, gas metering, and other functions relating to the use of hydrogen at MGR Dock 401.

Further to FIG. 4B, power and control bus 416 is connected to each docked MGR by power take-off lines to the power take-off connection point 415 at each of MGR bays 413. Power and control bus 416 contains the necessary power electronic components to monitor and regulate incoming power on each of the circuits connecting a specific MGR to the corresponding power take-off connection point 415, then further to power and control bus 416.

Further to FIG. 4B, each element depicted in FIG. 4B and discussed in the related text above may comprise appropriate sensors, digital and analog circuitry, and respective connections to related control and communication lines as appropriate to the embodiment. Such additional apparatus are operatively connected to RDS computing system 417. See also FIGS. 5, 7, 8, 10 and 11, and related text for depiction and descriptions of RDS computing system 417.

Figure 4C:
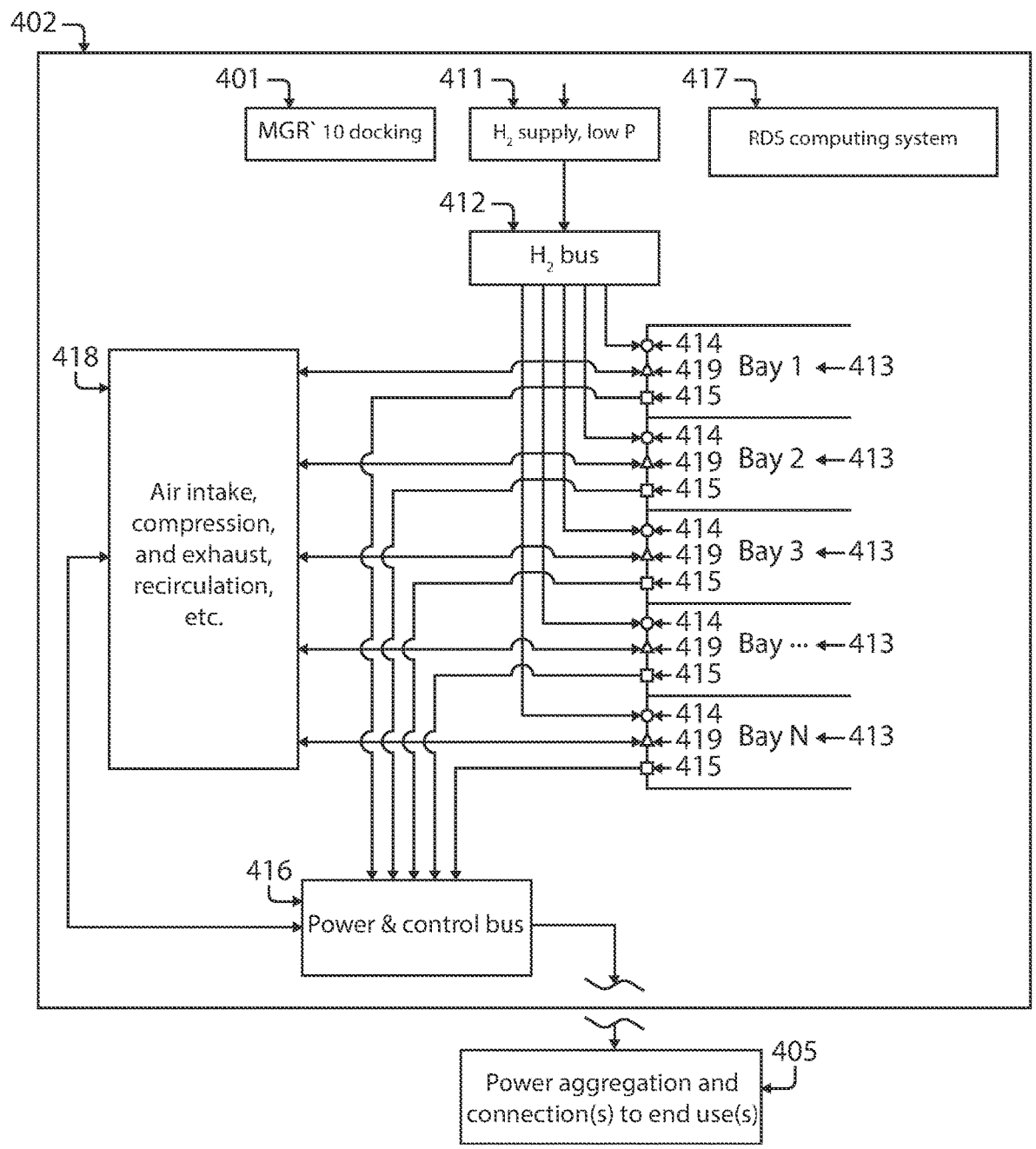
FIG. 4C depicts a schematic of an alternative embodiment of parking and docking for a plurality of MGRs.

FIG. 4C depicts a MGR Dock 402, a docking area for MGRs such as MGR 20. MGR Dock 402 comprises one or more parking locations MGR bay(s) 413. MGR Dock 402 may further comprise all elements relating to MGR Dock 401 as depicted in FIG. 4B and describe above, as well as additional elements included to support operability of MGRs such as MGR 20.

Further to FIG. 4C, offboard fuel cell system equipment 418 is present within a convenient distance to MGR bay(s)

413 so that the necessary connections between the apparatus which is present in offboard fuel cell system equipment 418 may be operably connected to MGRs docked at MGR bay(s) 413, by means of additional connection points 419.

For example, air handling systems can be large compared to fuel cell stacks, especially as stack power increases. An illustrative configuration of offboard fuel cell system equipment 418 would be to provide a single large air compressor and a related high volume air intake with filtering functionality. Suitably filtered and compressed air could be supplied to each additional connection point 419 through an air handling bus also included in offboard fuel cell system equipment 418.

Further to offboard fuel cell system equipment 418, power and control bus 416 may provide power to offboard fuel cell system equipment 418 as is necessary to operate the apparatus therein, such as air compression, exhaust recirculation, etc.

Further to FIG. 4C, each element depicted in FIG. 4C and discussed in the related text above may comprise appropriate sensors, digital and analog circuitry, and respective connections to related control and communication lines as appropriate to the embodiment. Such additional apparatus are operatively connected to RDS computing system 417.

Further to FIGS. 4B and 4C, real-time streamed data, and/or time-averaged values of real-time data (i.e., a series of values, where each value is the average of a time series sampled at a specified rate over a set period, e.g., a series of gas volumes as measured by a flow meter, where each value in the series is the average of sixty measurements taken over a period of 60 seconds) and other data pertaining to elements identified in FIGS. 4B and 4C are received by RDS computing system 417, and used by the RDS operating system and software modules thereof to monitor, operate and maintain the RDS 400.

Figure 4D:
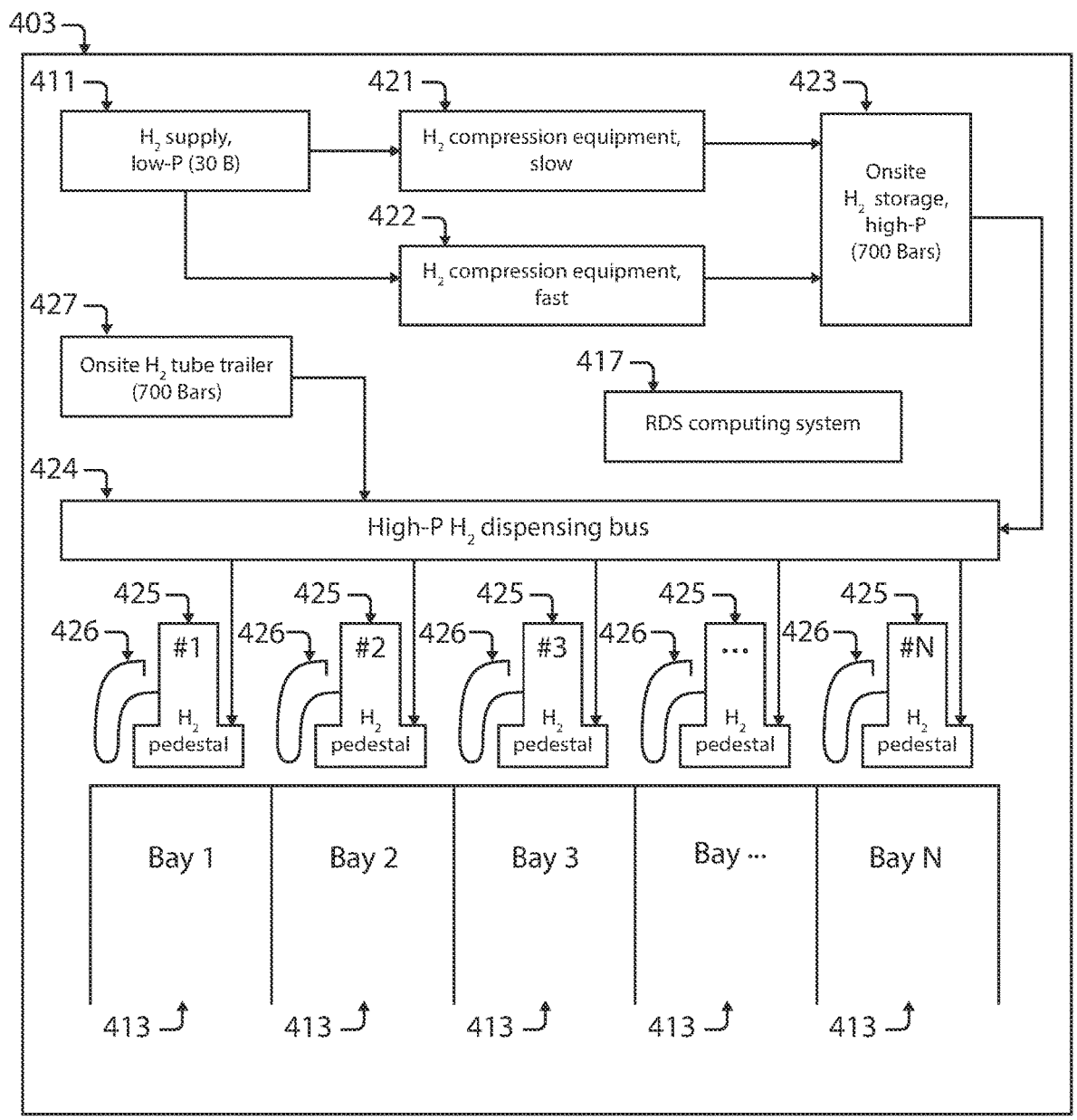
FIG. 4D depicts a schematic of an embodiment of a high pressure hydrogen dispensing facility.

FIG. 4D depicts high-pressure hydrogen dispensing facility 403. Hydrogen supply 411 supplies hydrogen to hydrogen compressor 421 (relatively low speed) and hydrogen compressor 422 (relatively high speed), both of which compressors are connected to on-site hydrogen storage tank 423, which stores hydrogen at 700 bars. Hydrogen supply 411 may be relatively low pressure. Preferably, hydrogen supply 411 may include on-site storage, and be provided by pipeline delivery, on-site generation of hydrogen by reformation of methanol, or on-site storage at low pressure of hydrogen. Additionally, hydrogen tube trailer(s) 427, which stores hydrogen transported by truck at 700 bars, may be present at high-pressure hydrogen dispensing facility 403.

Both on-site hydrogen storage tank 423 and hydrogen tube trailer 427 are connected to high pressure hydrogen dispensing bus 424, which dispensing bus feeds hydrogen at 700 bars to respective hydrogen dispensing pedestals 425. Hydrogen is dispensed by means of hydrogen dispensing hose and head 426 at each pedestal to the FCEV or MGR that is located in the respective MGR bay(s) 413.

As with other apparatus comprised by RDS 400, apparatus high-pressure hydrogen dispensing facility 403 comprise appropriate sensors, digital and analog circuitry, and respective connections to related control and communication lines as appropriate to the embodiment. Such additional apparatus are operatively connected to RDS computing system 417.

Further to FIG. 4D, each element depicted in FIG. 4D and discussed in the related text above may comprise appropriate sensors, digital and analog circuitry, and respective connections to related control and communication lines as appropriate to the embodiment. Such additional apparatus are operatively connected to RDS computing system 417.

Figure 4E:
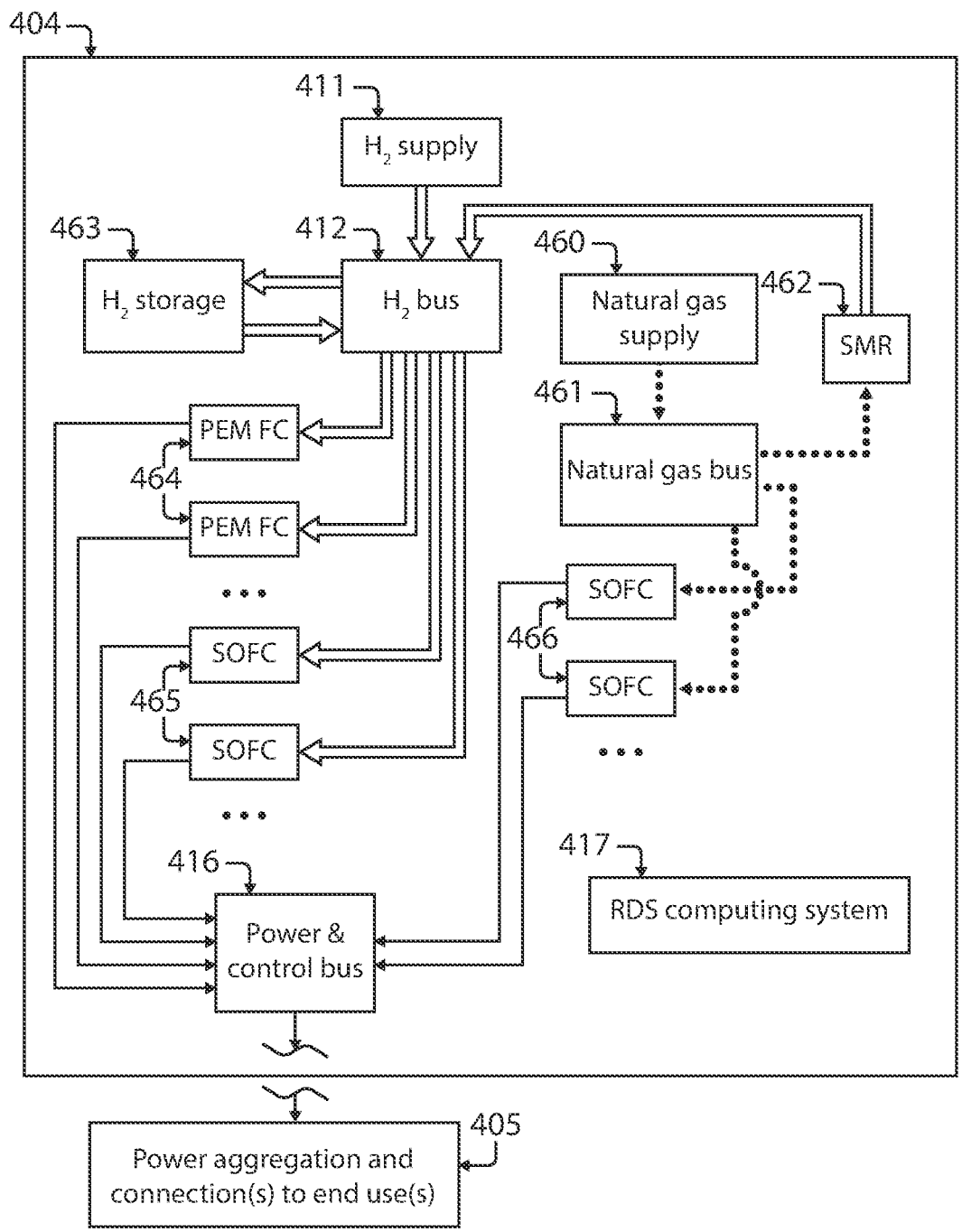
FIG. 4E depicts a schematic of an embodiment of a stationary fuel cell facility.

FIG. 4E depicts stationary fuel cell facility 404, which comprises supplies of hydrogen and/or natural gas, gas buses to control gas distribution, fuel cells to convert gas to power, power and control bus 416, and RDS computing system 417.

FIG. 4E further depicts hydrogen bus 412 is provided with hydrogen from at least one of two sources, comprising hydrogen supply 411 and steam methane reformer 462. Steam methane reformer 462 produces hydrogen by reforming natural gas, which is provided by natural gas bus 461, which is in turn provided with natural gas by natural gas supply 460. Hydrogen bus 412 may also send hydrogen from either source (411 or 462) to on-site hydrogen storage facility 463 when it is advantageous for the operation of RDS 400. On-site hydrogen storage facility 463 may include compression, liquefaction and other aspects of hydrogen storage known in the art as are appropriate to the particular implementation.

Further to FIG. 4E, steam methane reformer 462 may advantageously be equipped with carbon capture and storage technology. Carbon capture and storage technology is known in the art.

FIG. 4E further depicts PEM fuel cell system 464 and SOFC fuel cell system 465, both of which may be configured to be supplied with hydrogen by hydrogen bus 412. PEM fuel cell system 464 and SOFC fuel cell system 465 are further configured to supply power to power and control bus 416.

FIG. 4E further depicts SOFC fuel cell system 466, which may be configured to be supplied with natural gas by natural gas bus 461. SOFC fuel cell system 466 is further configured to supply power to power and control bus 416.

Each of PEM fuel cell system 464, SOFC fuel cell system 465 and SOFC fuel cell system 466 may comprise one or a plurality of fuel cell systems.

Further to FIG. 4E, each element depicted in FIG. 4E and discussed in the related text above may comprise appropriate sensors, digital and analog circuitry, and respective connections to related control and communication lines as appropriate to the embodiment. Such additional apparatus are operatively connected to RDS computing system 417.

Further to FIG. 4E, a person having ordinary skill in the art would recognize it would be advantageous to include aspects of the embodiments depicted in FIG. 4E in the embodiments depicted in FIGS. 4B, 4C and 4D.

Figure 4F:
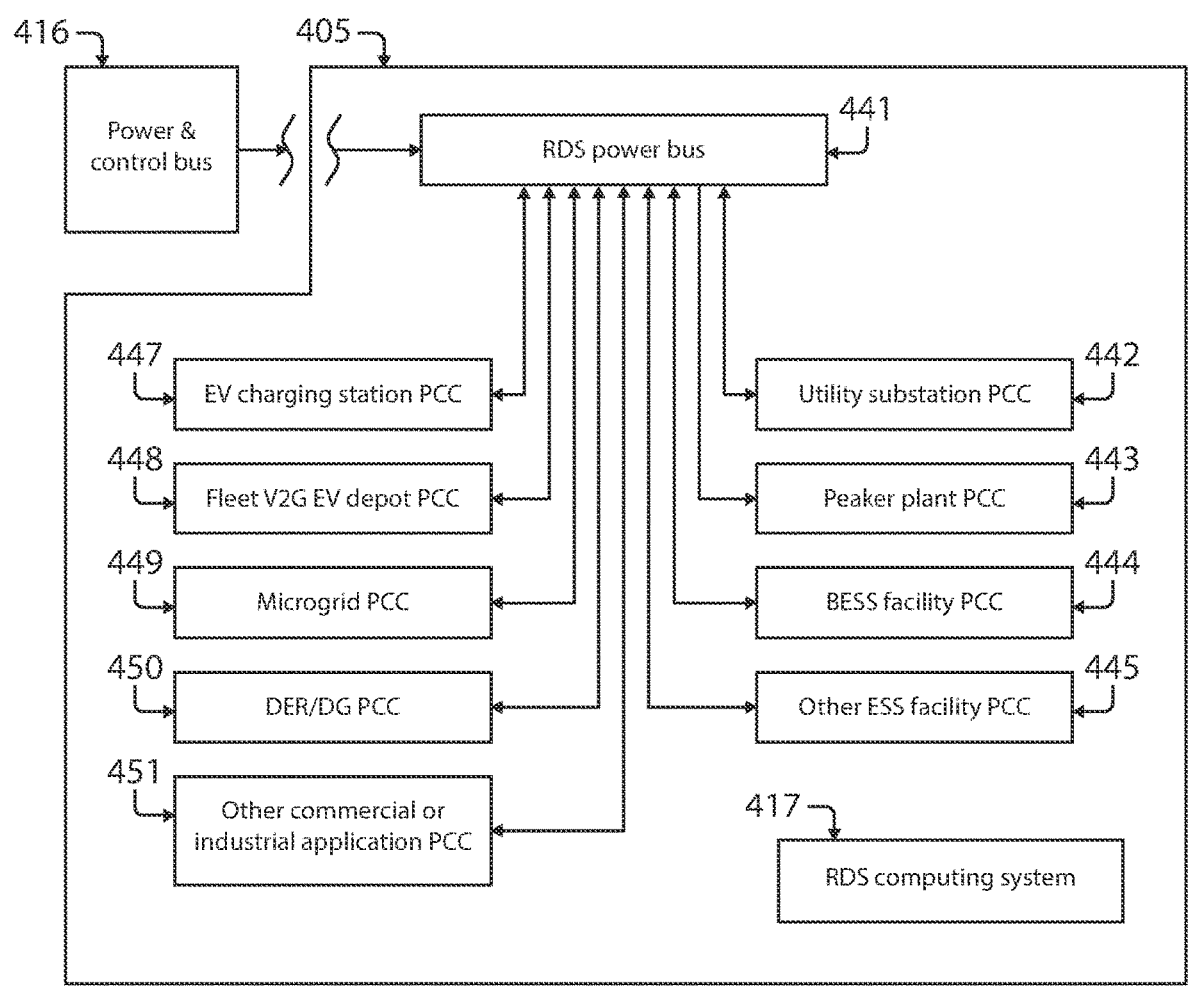
FIG. 4F depicts a schematic of an embodiment of power aggregation and end use connections.

FIG. 4F depicts power aggregation and end use connections 405, comprising various aspects of power flows within RDS 400.

FIG. 4F further depicts that power aggregation and end use connections 405 directs power flows from each of MGR Dock 401, MGR Dock 402 and stationary fuel cell facility 404 to RDS power bus 441, and further power flows from RDS power bus 441 to power handling electronics for illustrative enumerated end uses. In some cases, power flows between RDS power bus 441 and a given end use may be bi-directional. RDS power bus 441 receives power from power and control bus 416 located at power sources in a RDS 400, comprising MGR Dock 401, MGR Dock 402, and/or stationary fuel cell facility 404.

FIG. 4F further depicts sets of the appropriate power electronic and digital components known in the art which would be sufficient to transmit power from RDS power bus 441 to several illustrative uses for the electric power generated at RDS 400 (hereinafter, end use power connection components, or "End use PCC""). The end use PCCs comprise at least one of (i) utility substation PCC 442; (ii) peaker plant PCC 443; (iii) battery energy storage system PCC 444; (iv) other energy storage system PCC 445; (v) EV charging station PCC 447; (vi) EV fleet vehicle-to-grid depot PCC 448; (vii) microgrid PCC 449; (viii) distributed energy resources and distributed generation PCC 450; and (ix) other commercial or industrial application PCC 451. PCC elements 442-445 and 447-451 may be "behind-the-meter" or "in front of the meter," as appropriate to engineering context and economic criteria.

Further to FIG. 4F, each element depicted in FIG. 4F and discussed in the related text above may comprise appropriate sensors, digital and analog circuitry, and respective connections to related control and communication lines as appropriate to the embodiment. Such additional apparatus are operatively connected to RDS computing system 417.

Figure 5:
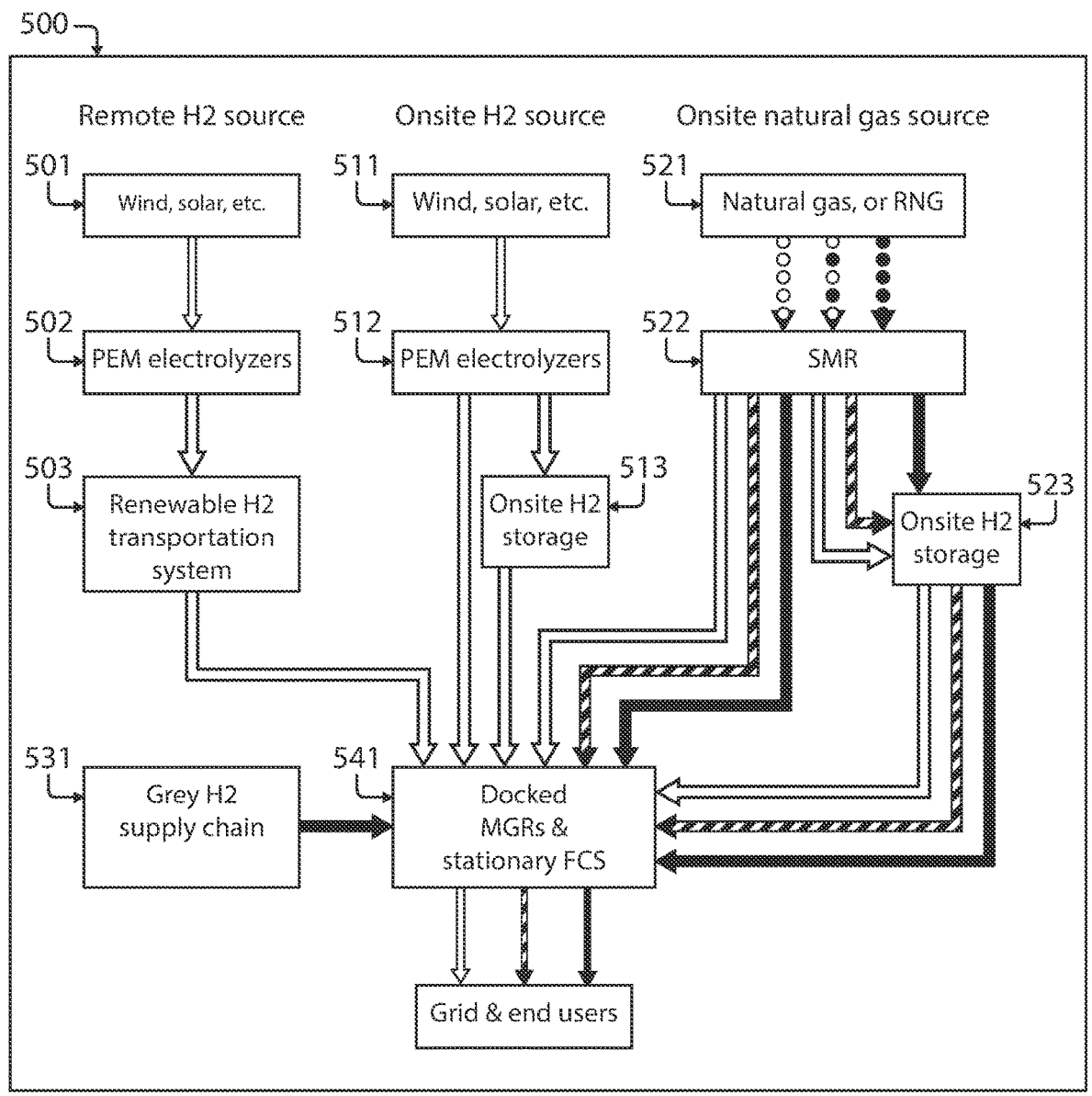
FIG. 5 depicts a schematic of an embodiment of a hydrogen supply chain.
Figure 5:
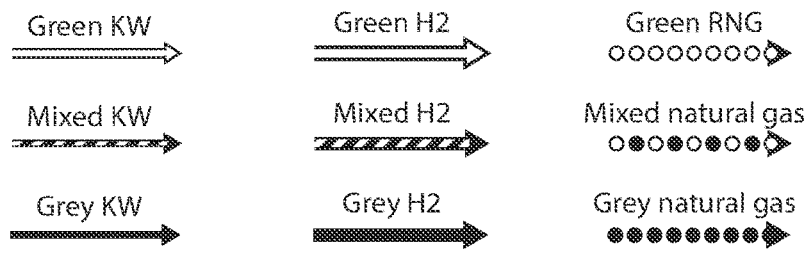

FIG. 5 depicts hydrogen supply chain 500, configured to supply hydrogen to RDS 400. FIG. 5 further depicts hydrogen sources that are remote or on-site with respect to the location of RDS 400.

Remote hydrogen sources provide hydrogen by using electrolysis to generate hydrogen, then providing post-generation processing and transport to RDS 400, where transport may be by pipeline, truck, rail, or other appropriate technology. Post-generation processing may include compression, cooling, etc.

Further, remote renewable energy source 501 may produce electricity by harnessing wind power, solar energy, hydro power, tidal energy, geothermal energy or other renewable energy resources as are known in the art. Remote renewable energy source 501 may advantageously include battery or other energy storage systems for levelizing power and other functions. Remote renewable energy source(s) 501 provide(s) renewable power to PEM electrolyzer system(s) 502, which generate and process renewable hydrogen as needed to provide RDS 400 with renewable hydrogen by means of renewable hydrogen transportation system 503. Alternatively, hydrogen may be produced by other methods as are known in the art.

Alternatively, on-site hydrogen may be provided by use of energy produced on-site at RDS 400, preferably renewably, for example by energy sources used by remote renewable energy source(s) 501. On-site renewable energy source(s) 511 provide(s) renewable power to PEM electrolyzer systems(s) 512, which in turn generates and processes renewable hydrogen as appropriate to provide RDS 400 with renewable hydrogen. Alternatively, hydrogen may be produced by other methods as known in the art. For example, other illustrative methods of producing hydrogen electrolyzer systems which are known in the art may be employed (e.g., alkaline and solid oxide electrolyzers). Further alternatives to PEM electrolyzer technology comprise other methods of hydrogen synthesis such as those being developed by Hysata (an electrolysis-based process producing hydrogen and oxygen from water, see https://hysata.com/technology/, accessed on 4/23/2022) and H2Pro (also a water-based process producing hydrogen and oxygen from water, see https://www.h2pro.co/technology, accessed on 4/23/2022). A further alternative to PEM electrolyzer technology comprises methods of converting sustainable feedstocks (e.g., landfill, municipal solid waste, agricultural waste, biomass) to hydrogen, renewable natural gas and other useful e-fuels such as those developed by Raver SR (see https://ravensr.com/steam-reformer-system/, accessed on 4/24/2022), SGH2 (see https://www.sgh2energy.com/technology, accessed on 4/24/2022), and Monolith Materials (see https://monolith-corp.com/methane-pyrolysis, accessed on 4/24/2022). Because hydrogen produced by on-site renewable energy source(s) 511 may not need to be compressed, transported or distributed, its production cost may be lower than that provided by remote renewable energy source(s) 501.

Alternatively, hydrogen produced by PEM electrolyzer systems(s) 512 may be stored in on-site hydrogen storage 513 when appropriate to uses at RDS 400, for example, on-site refueling of FCEVs.

On-site hydrogen may also be produced on-site by use of natural gas, for example, fossil fuel-based natural gas produced by fracking and other methods. Alternatively, renewably-produced natural gas ("RNG") can also be used to produce hydrogen on-site.

Preferably, on-site hydrogen is produced by steam methane reforming ("SMR") of natural gas 521 delivered by pipeline to a steam methane reformer 522 at RDS 400. More preferably, RNG is used to produce renewable hydrogen on-site by use of steam methane reformer 522. Additionally, hydrogen produced by SMR may be stored in on-site hydrogen storage 523 when appropriate to uses at RDS 400, for example, on-site refueling of FCEVs. See also FIG. 4E and related text for additional discussion concerning use of natural gas by RDS 400. Also preferably, on-site hydrogen may be produced by a methanol reformer.

Non-renewable hydrogen supply 531 may also be provided to RDS 400 by pipeline, truck etc.

Hydrogen, whether produced by non-renewable energy or renewable energy, may be supplied to docked MGRs 541 located at RDS 400 by renewable hydrogen transportation system 503, PEM electrolyzer system(s) 512, on-site hydrogen storage 513, steam methane reformer 522, on-site hydrogen storage 523, non-renewable hydrogen supply 531, or other methods of producing hydrogen. Docked MGRs 541 deployed at RDS 400 may comprise MGR 10, MGR 20, as depicted in FIGS. 4A, 4B and 4C. Additionally, docked MGRs 541 may comprise other MGR embodiments.

Additionally, hydrogen supply chain 500 may supply hydrogen for use in dispensing hydrogen at high pressure to FCEVs as depicted in FIG. 4D. Additionally, hydrogen supply chain 500 may supply hydrogen to stationary fuel cells that may be deployed at RDS 400 as depicted in FIG. 4E.

Further to FIGS. 4E and 5, instead of, or in addition to, using steam methane reformer 462 or steam methane reformer 522 to extract hydrogen from natural gas, alternative hydrogen-containing fuels may be processed by appropriate reforming technologies such as are known in the art. For example, methanol is readily reformable to hydrogen, and several commercial products are available for purchase.

Further to FIGS. 4D and 5, instead of, or in addition to, instead of using high-pressure hydrogen storage on site, low- or intermediate-pressure hydrogen storage may be used. Additionally, instead of storing hydrogen in gaseous form, RDS 400 may advantageously store hydrogen in liquid form.

Further, hydrogen-containing chemical storage may be also used to store hydrogen for use at RDS 400, including metal hydrides, non-metal hydrides, hydride materials, liquid organic hydrogen carriers, carbohydrates, and such other compounds and materials as are known in the art. Such storage may preferably be configured to provide hydrogen for use at low pressure.

The non-renewable or renewable character of hydrogen supplied to RDS 400 can be described as "grey" or "green", as is known in the art. FIG. 5 includes indicia of the "color" of hydrogen ("green H2", and "grey H2") that may be supplied to docked MGRs 541. Similar indicia are also used to describe the provenance of electric power that is produced by docked MGRs 541 ("kw.H2.green" and "kw.H2.grey"). Both MGRs and stationary fuel cells disclosed by this application may produce electric power that can be so described. Such power may be also be described as green electric power, grey electric power, a mix of green and grey electric power, etc.

In addition to green and grey, other colors may be used as shorthand descriptions for the provenance of hydrogen (and at least herein, of electric power produced by such hydrogen). Examples include blue hydrogen (made from fossil fuel, but the carbon dioxide produced during hydrogen synthesis is captured and stored), pink (made using nuclear power) and turquoise (made by pyrolysis of methane, whereby solid carbon is a by-product of the reaction). The terms blue hydrogen, turquoise hydrogen and pink hydrogen (as well as other colors) are known in the art.

During operation of RDS 400, RDS computing system 417 may maintain records of the provenance of hydrogen that is supplied to MGRs and stationary fuel cells. Further, RDS computing system 417 may cause hydrogen of a given provenance (e.g., 100% green; 20%-80% mix of green and grey, respectively; 70%-30% mix of green and pink, etc.) to be delivered to a given MGR or set of MGRs. Further, RDS computing system 417 may cause electric power of a given provenance to be provided to a given customer. Further, RDS computing system 417 may cause hydrogen of a given provenance to be stored in a given MGR, which MGR later may use that hydrogen to provide charging services to an EV at a location that is selected by the EV user, thereby controlling the provenance of electric power stored by the EV. Further, RDS computing system 417 may use blockchain technologies to record the provenance of hydrogen consumed and electric power delivered in the course of operations. Additionally, RDS computing system 417 may accommodate a customer requirement that a range of provenance of electric power delivered be maintained over time, but not be required for each kwh of power that is delivered. Further, RDS computing system 417 may provide that carbon capture performed at RDS 400, and that blockchain technologies be used to record the specifics of that action.

In addition to describing the provenance of hydrogen as a function of the carbon content of energy used in its generation (i.e., green, blue, grey, etc.), a similar concept may be applied in connection with any other fuel. For example, because some fuel cells are able to use natural gas as a fuel (see, e.g., stationary SOFC units as depicted in FIG. 4D), it may be advantageous to maintain information on the carbon content of that natural gas. As discussed above, natural gas can be purely fossil fuel-based. Alternatively, RNG can be synthesized from renewable resources such as biomass. Alternatively, RNG can be gathered from various types of facilities, e.g., landfills, human waste treatment plants, and animal waste treatment plants.

Such natural gas may also be described as green, grey, blue, etc. (and so characterized by RDS 417), depending on the process that is used to obtain it. And in a manner analogous to that described above for hydrogen, the renewable provenance of natural gas may be recorded, considered and controlled in providing fuel for conversion by MGRs to electric power.

Further, in addition to hydrogen and natural gas, other fuels that can be made renewably (or non-renewably) are suitable for use in fuel cells (or can be used as hydrogen carriers). Examples known in the art include ammonia, methanol and numerous other hydrogen-containing compounds.

In addition to providing customers with the ability to track and control the carbon content of hydrogen or other fuels used in generation of power that is delivered, analogous methods may be used to track other aspects of a given fuel. For example, it may be advantageous for a given customer to control the character of a given fuel where the synthesis of that fuel may create certain emissions, whether gaseous or particulate, depending on the method that is used, wherein the customer prefers to avoid certain methods, or employ other methods.

Alternatively, other customers may find it advantageous to control the geographic provenance of a given fuel, avoiding certain sources, or preferring others.

Additionally, it may be advantageous that RDS computing system 417 maintains a discrete set of data structures which integrate information concerning carbon content, emissions and geographic provenance as discussed above and as depicted in FIG. 5. Further, such a discrete set of data structures may be used by the operator(s) of RDS 400 locations and respective customers to control the timing, nature, location and quantity of electricity generation based on information included in such data structures.

Figure 6:
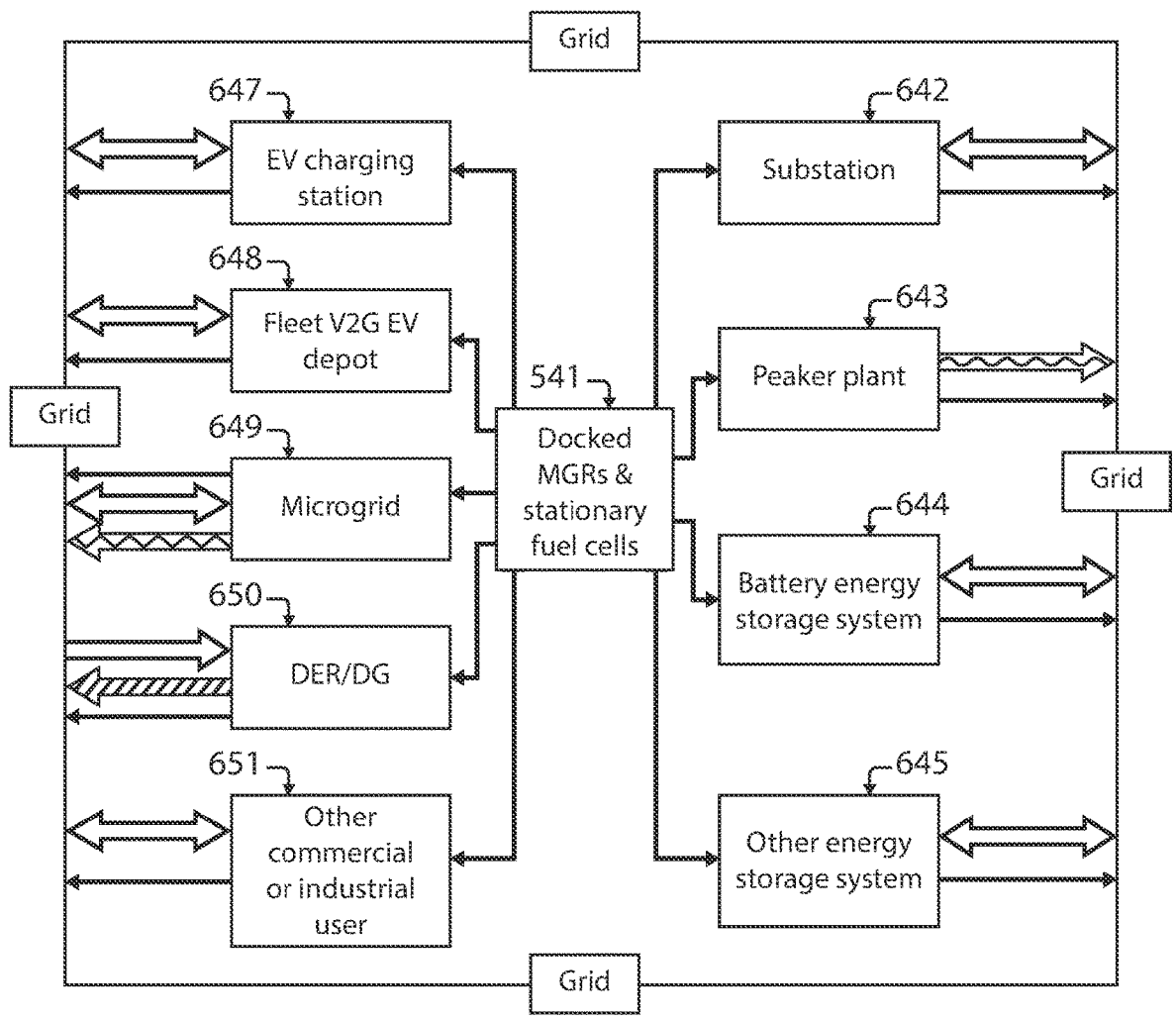
FIG. 6 depicts a schematic of an embodiment of relationships between MGRs, grid and end-use applications.

Considered together, FIGS. 5 and 6 depict a metagrid of hydrogen and electricity. As described above, FIG. 5 depicts how hydrogen may initially be generated, then moved through a supply chain to a set of docked MGRs 541, which may be deployed at one or more facilities where a RDS 400 is located. FIG. 6 depicts the flow of the electricity among docked MGRs 541, end users, and the grid (wherein "grid" may refer to a local electricity distribution network, a national (or regional) electricity transmission network, or both) after hydrogen delivered by hydrogen supply chain 500 has been converted by docked MGRs 541 to electricity and delivered to end users. End users include any and all users of electrical power that may be transmitted by the grid, including conventional utility customers (residential, commercial or industrial), utilities themselves, microgrids, independent power producers, etc.

Docked MGRs 541 represent electric power produced by MGRs 10 and MGRs 20 as depicted in FIGS. 2A, 2B, 3A and 3B (and as described by related text), and such MGR embodiments that are disclosed, taught or suggested by this application. MGRs may preferably be deployed as depicted in FIGS. 4A, 4B, 4C, and 4F (and as described by related text). Additionally, docked MGRs 541 represents electric power produced by stationary fuel cells such as those depicted in FIG. 4E (and as described by related text).

For the purposes of this application, the electric power produced by docked MGRs 541 is called Kw.MGR. Other sources of electric power depicted in FIG. 6 include the grid ("Kw.grid"), distributed energy resources ("Kw.DER"), electric power produced by peaker plants before it is transmitted to the grid ("Kw.peaker"), and electric power produced by microgrids ("Kw.microgrid").

Further, other sources of electric power are known in the art, and while not depicted in FIG. 6, are intended to be comprised in the sources of electric power that may be received by potential users of electric power produced by docked MGRs 541. These sources comprise electric power from geothermal power production ("Kw.Geotherm"), hydro power operations ("Kw.Hydro"), coal-fired electric generation plants ("Kw.Coal"), tidal energy plants ("Kw.Tidal"), residential solar installations ("Kw.Homesolar"), concentrated solar installations ("Kw.CSP"), and other sources of power generation as are known in the art.

In a manner similar to the characterization of provenance of hydrogen as green, grey, blue, etc. (discussed above in connection with FIG. 5 and related text), the computing systems described in this application may also maintain and use data structures relating to the source of electric power, e.g., Kw.MGR, Kw.grid, Kw.DER, Kw.Geotherm, Kw.Hydro, Kw.Coal, etc. Such data structures may be advantageously used in computer applications involving many aspects of utility operations and the delivery of electric power. Additional applications include uses by power-intensive entities (e.g., certain electricity consumers and electricity producers), power regulating authorities, government agencies and Federal, State and local governments. A non-limiting selection of examples comprises: (i) long- and short-term supply and demand planning, as well as pricing aspects of electric power markets; (ii) power planning and monitoring by regional transmission organizations ("RTO") and Independent System Operators ("ISO"); (iii) emergency operations of utilities in cases of natural disasters; (iv) modelling and analysis of actual and potential utility resilience; (v) day-to-day operations and long-term planning of utilities, balancing area authorities, and regional power authorities; and (vi) day-to-day operations and long-term planning of electric power-intensive businesses, including but not limited to EV charging networks, Fleet V2G EV depots, microgrids, and independent power producers.

Prior art grid systems provide users with electric power from the local utility. As of 2020, approximately 69% of grid power in the United States is generated by fossil fuels. To the extent that users generate renewable electricity on their own (e.g., home solar), such electric power serves to effectively decarbonize the grid, as it lessens the amount of grid power consumed by users.

Further to FIG. 6, when docked MGR 541 and the related subject matter of this application are used to provide power to users and the grid, power flows from the local utility to users may be further abated, preferably scheduled by using information from RDS 400 and related computing systems. Further, power flows from docked MGR 541 can be passed through users to the grid, thereby decarbonizing the power supplied by the grid, to the extent that power from docked MGR 541 is green, blue, etc. Further, because the carbon content of power provided by docked MGR 541 can be monitored and controlled, a utility may better plan and implement the level of decarbonization that it requires at a given point in time.

Further to FIG. 6, various users of grid power and grid-related applications of a local utility comprise the electric power flows listed below. Typically, such electric power flows would be two-component, where electric power flows to/from the user or grid-related utility application include both Kw.MGR and Kw.grid, such as: (i) utility substation 642 may be supported by the availability of Kw.MGR; (ii) peaker plant 643 may be able to abate its output when Kw.MGR is provided. In cases where the plant uses single-cycle natural gas turbines, Kw.MGR may increase overall efficiency of fuel consumption; (iii) BESS facility (Battery Energy Storage System) 644 may be able to increase its duration and power when provided with Kw.MGR; (iv) other ESS (Energy Storage System) 645 may also be able to increase its duration and power when provided with Kw.MGR; (v) EV charging station (and networks thereof) 647 may be able to decrease its consumption of Kw.grid when provided with Kw.MGR, lessening demand charges; (vi) fleet V2G EV depot (and networks thereof) 648 may be able to increase its duration and power when provided with Kw.MGR; (vii) microgrid 649 may be able to reduce its consumption of Kw.grid; (viii) DER/DG 650 (distributed energy resource, or distributed generation); and (ix) other commercial or industrial user 651.

Further to peaker plant 643 and peaker plant PCC 443 of FIG. 4F, deployment MGRs and other technology discussed in this application integrated with a peaker plant for power generation is illustrative. Numerous other types of utility-scale power plants may also advantageously deploy MGRs and other technology discussed in this application, including but not limited to power plants based on (i) coal combustion; (ii) nuclear fission; and (iii) combined cycle natural gas turbines. Additionally, industrial sites which deploy power plants to provide for their own power needs may also advantageously deploy MGRs and other technology discussed in this application. Such plants may be based on a number of technologies, including those using natural gas and steam turbines of various types, including but not limited to combined cycle natural gas technology.

Additionally, to the extent that Kw.MGR is green (or otherwise low carbon, low emission, etc.), utilities and users can decarbonize the electric power that is generated and consumed.

Further, because the flow of kw.MGR into the grid from docked MGRs 541 represents an entirely independent source of power from Kw.grid, resilience of the grid is increased.

Further, because MGRs are mobile by definition, the distribution of docked MGR(s) 541 may be varied over time and space in accordance with daily or seasonal variations, changes in economic activity, natural disasters, climate emergencies, long-term climate changes, etc. Such dispatchability of docked MGR(s) 541 would serve to materially increase grid resilience.

Further, to the extent that fuels other than hydrogen (such as natural gas) are used to produce Kw.MGR, grid resilience is increased, as the use of a plurality of fuels, each with its own supply chain, will provide additional and independent fuel supplies.

Further to FIGS. 5 and 6, a plurality of RDS 400 can be considered to be nodes in a network (hereinafter, "metagrid") comprising hydrogen supply chain(s) 500, docked MGRs 541 and electric grid(s). It may be advantageous to model power flows through such a metagrid in kw and kwh. Such power flows may advantageously use the specific energy of hydrogen as a kw/kwh proxy for the mass of hydrogen transported, wherein for every kilogram of hydrogen supplied, the lower heating value of hydrogen ("LHV") in kilowatt-hours is used as a proxy (approximately 33.31 kwh per kg).

Further, control of such power flows and management thereof may also benefit from use of an anticipated conversion efficiency which would be expected to result at the point of electrochemical conversion of hydrogen to electricity in a fuel cell stack. For example, the prior art Toyota Mirai FCEV from model year 2017 has a fuel cell stack efficiency of between about 50 and 66%, and a fuel cell system efficiency of between about 40 and 64%.

It may further be advantageous to optimize routes and schedules of MGRs as they move among a set of RDS 400 locations and customer charging locations. Further, some customer charging locations may comprise instances of RDS 400 themselves. Further, it may be advantageous to model MGRs as a distinct class of mobile DERs having electric power potential that may vary depending on the location of a given MGR, i.e., whether it is charging a BEV, whether it is docked at RDS 400, what resources are available to a given MGR at a given RDS 400, etc.

Figure 7:
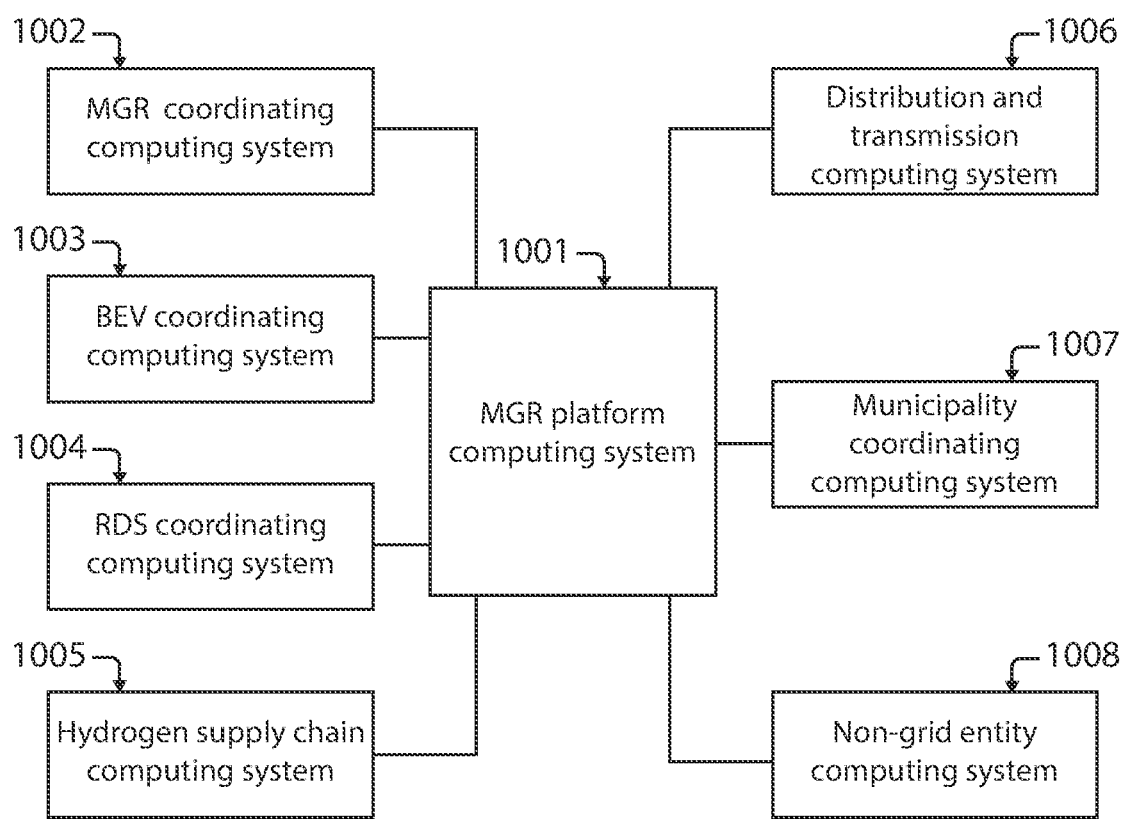
FIG. 7 depicts a schematic of an embodiment of an MGR platform computing system.

FIG. 7 depicts an architecture for a computer platform for operating the embodiments disclosed above. FIG. 7 further depicts MGR platform computing system 1001 (hereinafter, "PCS 1001"). FIG. 7 further depicts several other computing systems, including the following systems.

MGR coordinating computing system 1002. MGR coordinating computing system 1002 communicates with onboard MGR computing system 114 (not depicted in FIG. 7) and MGR user app 81 (not depicted in FIG. 7). These three computing systems together are also configured to communicate with BEV coordinating computing system 1003 and BEV user app 91.

BEV coordinating computing system 1003, which communicates with BEV user app 91 (not depicted in FIG. 7).

RDS coordinating computing system 1004, which is configured to communicate with one or more instances of RDS computing system 417 (not depicted in FIG. 7). Additionally, RDS coordinating computing system 1004 is configured to communicate with hydrogen supply chain computing system 1005.

Hydrogen supply chain computing system 1005, configured to communicate with hydrogen supply chain 500 (not depicted in FIG. 7), is additionally configured to communicate with RDS computing system 417 (not depicted in FIG. 7).

FIG. 7 also depicts distribution and transmission computing system 1006, municipality coordinating computing system 1007, and (vii) non-grid entity coordinating computing system 1008.

As depicted in FIG. 7, PCS 1001 is networked to each of the computing systems listed above (numbered 1002 to 1008; hereinafter, "NCS") and is configured to communicate with each. Further, PCS 1001 comprises a central repository for data generated by operation of the embodiments disclosed above (hereinafter, "MGR.tech"), as depicted in FIGS. 2 to 6 and discussed throughout this application. Together, PCS 1001 and NCS are configured to operate an entity that uses MGR.tech to charge BEVs, improve grid resilience, decarbonize electric power used to operate BEVs, and decarbonize the grid. This entity is hereinafter referred to as "MGR.operation"). PCS 1001 is further configured to provide planning, pricing, and operational parameters as appropriate to the MGR.operation. Communication between the various computing systems depicted in FIGS. 7, 8, 9, 10, 11, 12, 13 and 14 may be accomplished by means of application program interfaces or other methods known in the art.

Figure 8:
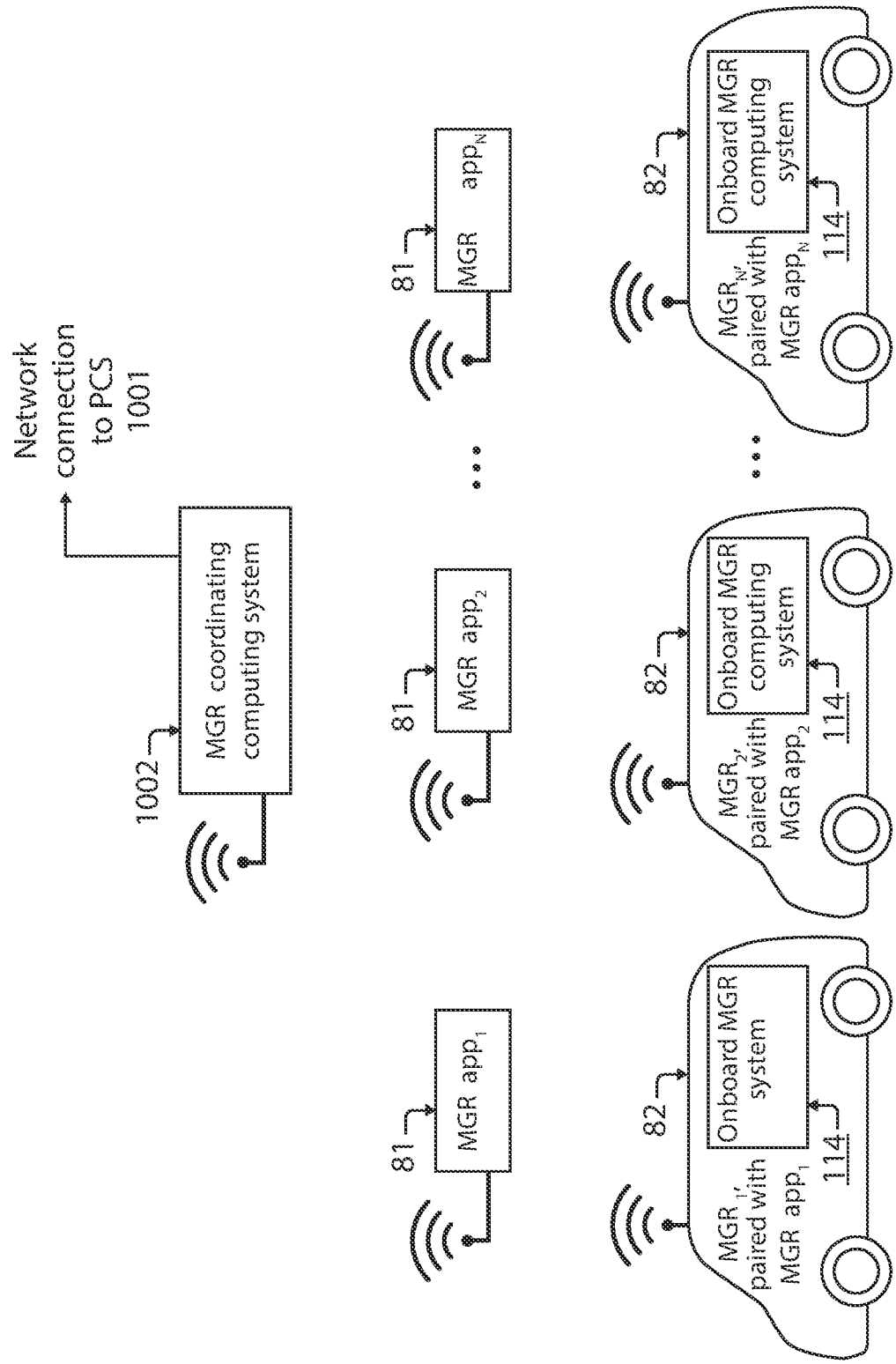
FIG. 8 depicts a schematic of an embodiment of an MGR coordinating computing system.

FIG. 8 depicts MGR coordinating computing system 1002, onboard MGR computing system 114, and MGR user app 81, which together are configured to operate MGRs 82 that are deployed by MGR.operation. Such operation may include: (i) scheduling and routing MGRs to provide charging services to a plurality of BEVs; (ii) scheduling and routing MGRs among a plurality of RDS 400 locations; (iii) monitoring and optimizing output electric power levels and efficiency of fuel cell stacks of MGRs; (iv) using a blockchain computing engine to manage carbon content and other parameters according to BEV user profiles and other customers of MGR.operation; and (v) using a machine learning engine to analyze data from fuel cell operation during BEV charging sessions to improve fuel cell performance.

MGR coordinating computing system 1002 is further configured to communicate over an internet connection with onboard MGR computing systems 114 in a plurality of MGRs which may be operated by MGR.operation. MGR coordinating computing system 1002 is further configured to communicate with a plurality of instances of MGR user app for communication with MGR users during operation.

Each instance of MGR user app 81 is configured to communicate with BEV user apps, for example, instances of BEV user apps that may be associated with specific BEVs scheduled to be charged by the MGR. MGR user app 81 is further configured to query a given BEV user app to confirm specifics of a scheduled charging session, including charging speed, pricing, carbon content to be allocated to the BEV, whether MGR.operation should perform carbon capture as specified by the BEV user app, etc.

Additionally, each instance of onboard MGR computing system 114 is configured to communicate wirelessly with RDS computing system 417 when the associated MGR is docked at an RDS 400 facility.

Figure 9:
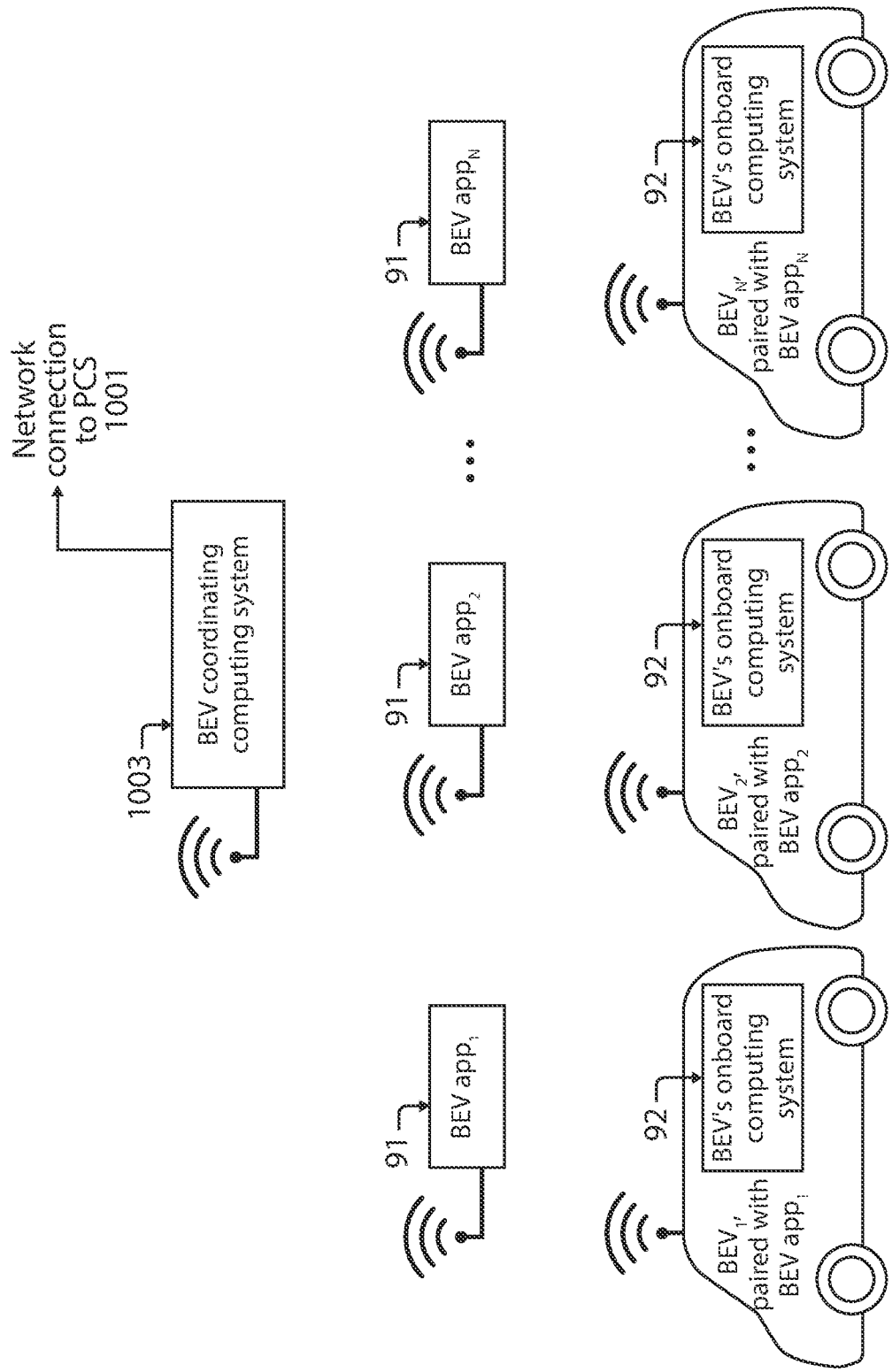
FIG. 9 depicts a schematic of an embodiment of a BEV coordinating computing system.

FIG. 9 depicts BEV coordinating computing system 1003 and BEV user app 91. BEV coordinating computing system 1003 is configured to monitor a plurality of BEVs, where BEVs occasionally require charging services. BEV coordinating computing system 1003 is further configured to communicate wirelessly with BEV user app 91, instances of which are employed by BEV users to obtain charging services from MGRs operated by MGR.operation.

Each instance of BEV user app 91 is configured to associate itself with a particular BEV (or specified set of BEVs) and to communicate wirelessly with a BEV's onboard computing system, wherein that onboard computing system provides BEV user app 91 with access to BEV system parameters (e.g., battery capacity, vehicle weight) and operating data (e.g., BEV speed, battery state of charge ("SOC").

Each instance of BEV user app 91 is further configured to provide BEV user with the ability to create and edit a profile. Such profile may comprise BEV user choices concerning pricing plans, carbon content of kwh provided, specifics of carbon capture and storage desired, charging session preferences, etc. Charging session preferences may comprise charging speed, importance of minimizing battery degradation, etc.

Each instance of the BEV user app 91 is further configured to monitor the SOC of the paired BEV's battery over the course of its operation. The BEV user app is further configured to monitor all charging sessions, including those provided by MGRs, and those obtained at prior art EV charging stations.

BEV coordinating computing system 1003 may be further configured to monitor each BEV's SOC so as to optimize battery life in view of charging and driving history, battery specifications, and temperature conditions experienced by the battery, including battery pack temperature data, and exterior temperatures experienced by the BEV. Preferably, such monitoring is continuous, with data stored on BEV coordinating computing system 1003. Computing capability used to analyze and optimize BEV battery life is known in the art. Examples include the software products provided by companies such as Recurrent Motors, Inc. and TWAICE Technologies GmbH.

Additionally, BEV coordinating computing system 1003 may be configured to use each BEV's SOC in the context of each BEV's driving history to predict and suggest MGR charging session times and locations. BEV coordinating computing system 1003 may further be configured to predict and suggest charging session times and locations at prior art charging stations.

Additionally, each instance of BEV user app 91 is configured to provide BEV user with a GPS interface, wherein said interface displays the BEVs location on a map. Such systems are well known in the art, and have been included as standard equipment in most automobiles for several years. BEV user app 91 is further configured to cause the GPS interface to display numerous aspects of information, comprising (i) the locations of MGRs which are present within the area displayed by the GPS interface; (ii) amount of charge available on each displayed MGR; (iii) range of available charging speed available on each displayed MGR; (iv) cost structure for charging services for each displayed MGR; (v) effective carbon content of available charge for each displayed MGR; and (vi) availability of each displayed MGR, wherein availability includes [a] shaded area on the GPS display where each displayed MGR is available for charging, and [b] times during which each displayed MGR is available for charging.

BEV user app 91 also includes functionality allowing a BEV user to limit the MGRs displayed by the GPS interface to those which can provide charge as specified by one or more aspects of BEV user profile.

BEV user app 91 also includes functionality allowing BEV user to use the GPS interface to select a displayed MGR for charging service.

BEV coordinating computing system 1003 also communicates with PCS 1001 to transfer and synchronize data from other computing systems as is needed for operation of BEV user app 91.

Figure 10:
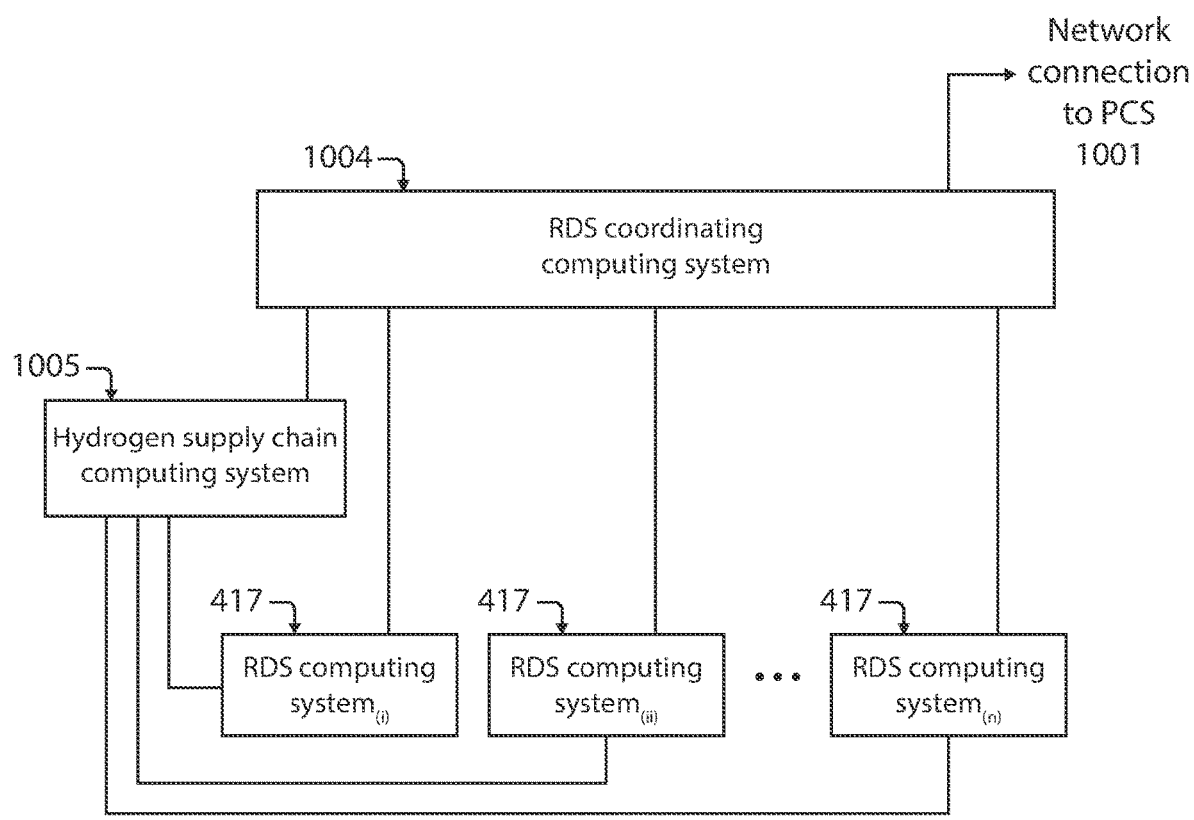
FIG. 10 depicts a schematic of an embodiment of an RDS coordinating computing system.

FIG. 10 depicts RDS coordinating computing system 1004 and RDS computing system 417. RDS coordinating computing system 1004 is configured to communicate with instances of RDS computing system 417 at each RDS 400 location. RDS coordinating computing system 1004 is additionally configured to communicate with hydrogen supply chain computing system 1005.

RDS computing system 417 is configured to monitor and direct the operation of hardware that comprises RDS 400 as depicted in FIGS. 4A-4F and described by related text.

Figure 11:
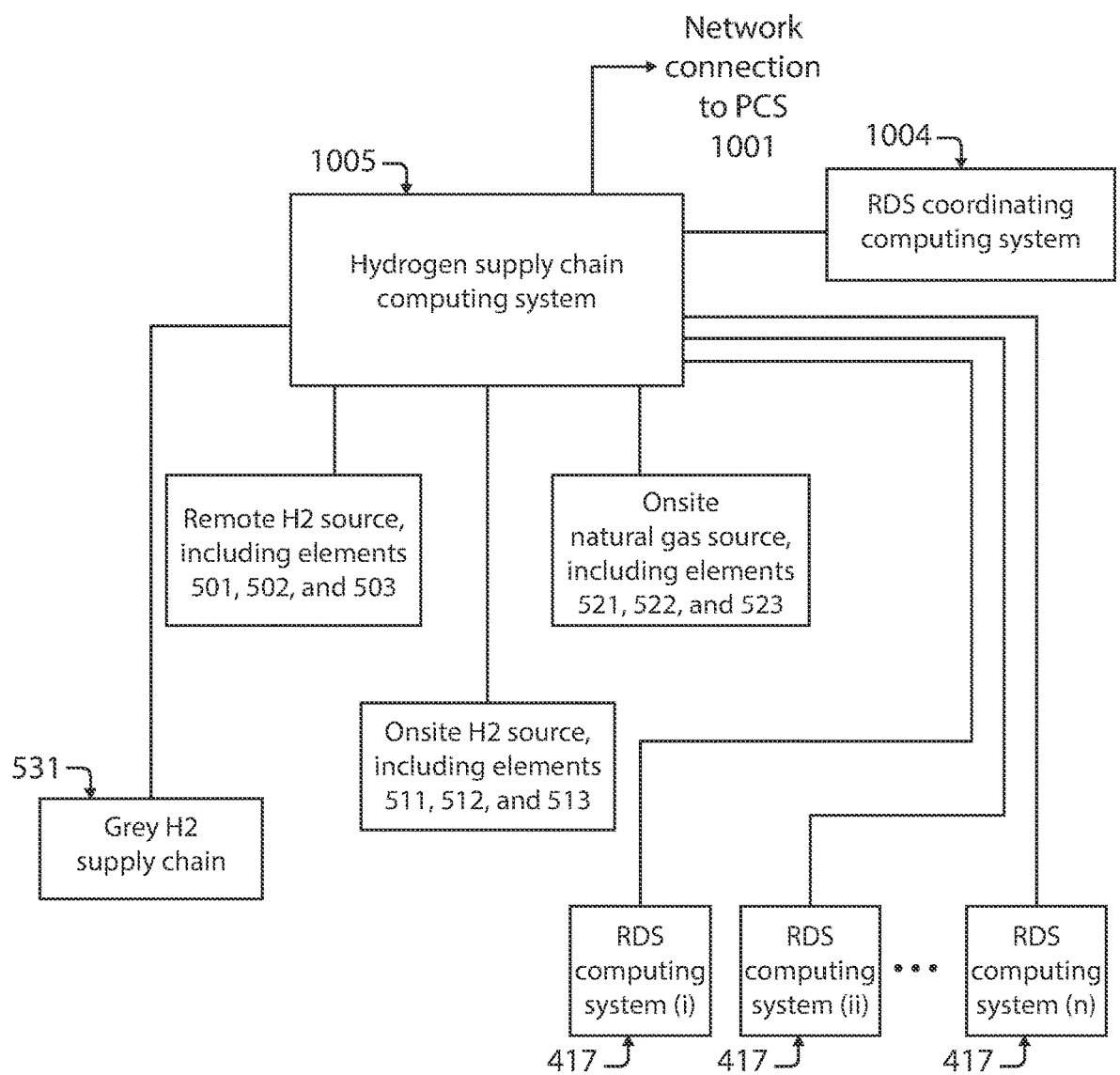
FIG. 11 depicts a schematic of an embodiment of a hydrogen supply chain computing system.

FIG. 11 depicts hydrogen supply chain computing system 1005. Hydrogen supply chain computing system 1005 is configured to operate hydrogen supply chain 500, and additionally is configured to communicate with RDS computing system 417, RDS 400, MGRs 10 and 20, and fuel cell-based power generation systems 100 or 200.

Hydrogen supply chain computing system 1005 is further configured to monitor and operate a remote hydrogen source such as depicted in FIG. 5 and described in the related text, comprising elements 501, 502 and 503.

Hydrogen supply chain computing system 1005 is further configured to monitor and operate an on-site hydrogen source such as depicted in FIG. 5 and described in the related text, comprising elements 511, 512 and 513.

Hydrogen supply chain computing system 1005 is further configured to monitor and operate an on-site natural gas source such as depicted in FIG. 5 and described in the related text, comprising elements 521, 522 and 523.

Hydrogen supply chain computing system 1005 is further configured to monitor and operate a grey hydrogen supply chain such as depicted in FIG. 5 and described in the related text, comprising element 531.

Figure 12:
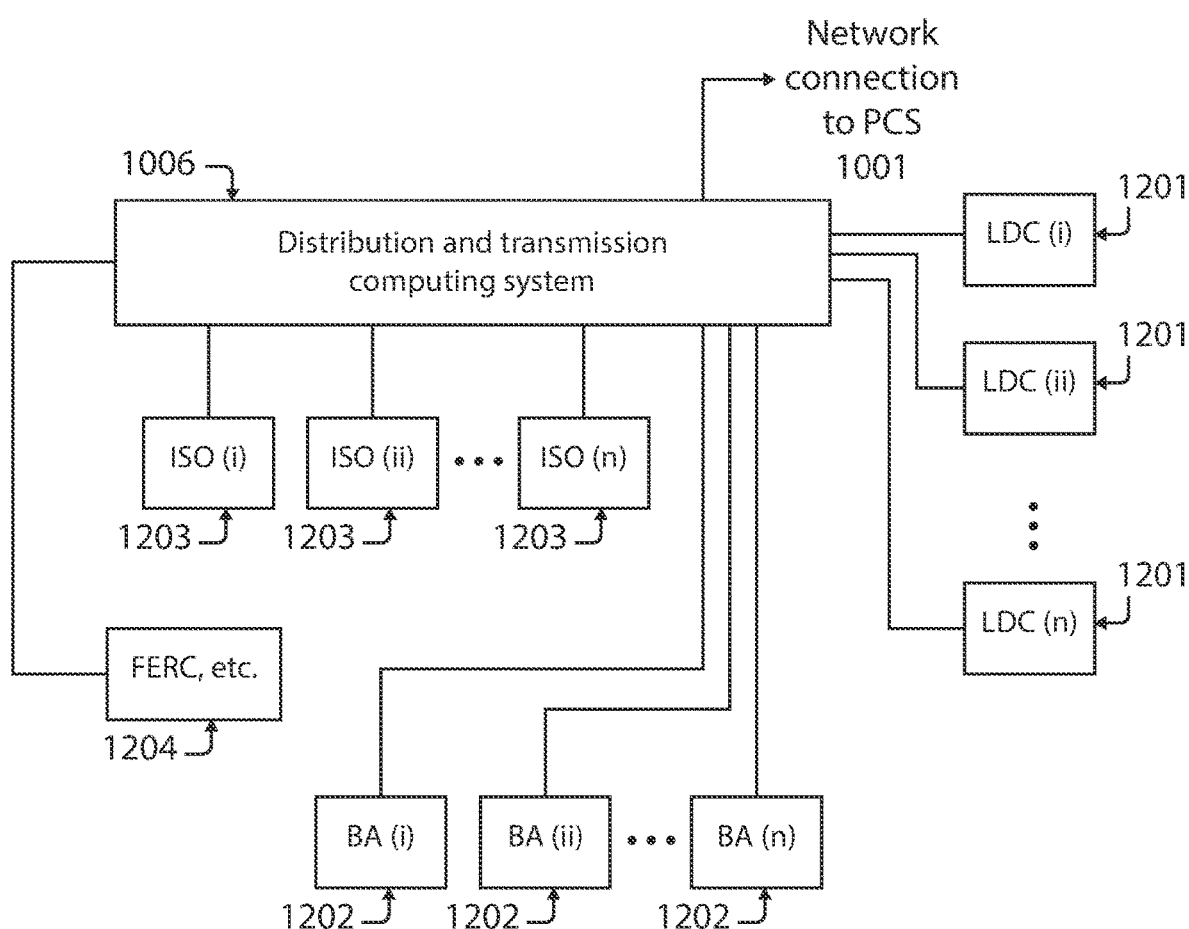
FIG. 12 depicts a schematic of an embodiment of a distribution and transmission computing system.

FIG. 12 depicts distribution and transmission computing system 1006. Distribution and transmission computing system 1006 is configured to communicate with computing systems of one or more local distribution companies ("LDC") 1201.

Distribution and transmission computing system 1006 is further configured to communicate with computing systems of one or more balancing authorities ("BA") 1202.

Distribution and transmission computing system 1006 is further configured to communicate with computing systems of one or more independent system operators ("ISO") 1203.

Distribution and transmission computing system 1006 is further configured to communicate with computing systems of one or more governmental authorities 1204, e.g., the Federal Energy Regulatory Commission ("FERC, etc.").

Information exchanged between distribution and transmission computing system 1006 and the computing systems of LDC 1201, BA 1202, ISO 1203 and FERC, etc. 1204 may comprise real-time operational data on pricing, power, fuel, etc.

Figure 13:
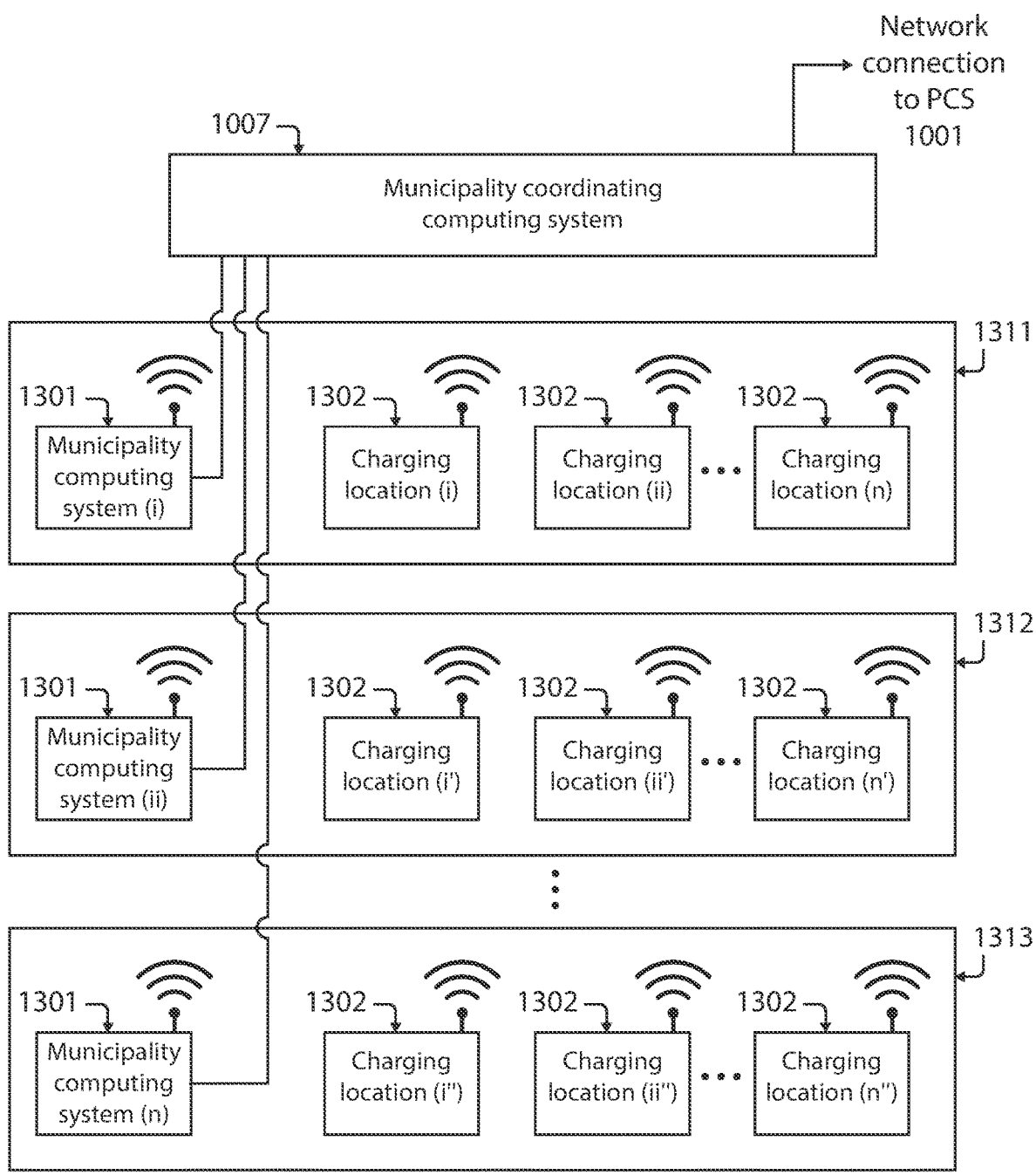
FIG. 13 depicts a schematic of an embodiment of a municipality coordinating computing system.

FIG. 13 depicts municipality coordinating computing system 1007. Each of municipalities 1311, 1312 and 1313 comprises a municipality MGR computing system 1301. Municipality coordinating computing system 1007 communicates with each instance of municipality MGR computing system 1301. Each municipality comprising a municipality MGR computing system 1301 also comprises one or more charging locations 1302, wherein an MGR and a BEV may park while the MGR delivers charging services to the BEV.

Municipality coordinating computing system 1007 may communicate with instances of municipality MGR computing system 1301.

Further, charging locations 1302 may be configured to provide parking metering services, comprising parking location occupancy monitoring and vehicle identify confirmation.

That FIG. 13 depicts only three municipalities 1311, 1312 and 1313 is illustrative, as the number of municipalities served by municipality coordinating computing system 1007 is limited only by technical and economic resources.

Figure 14:
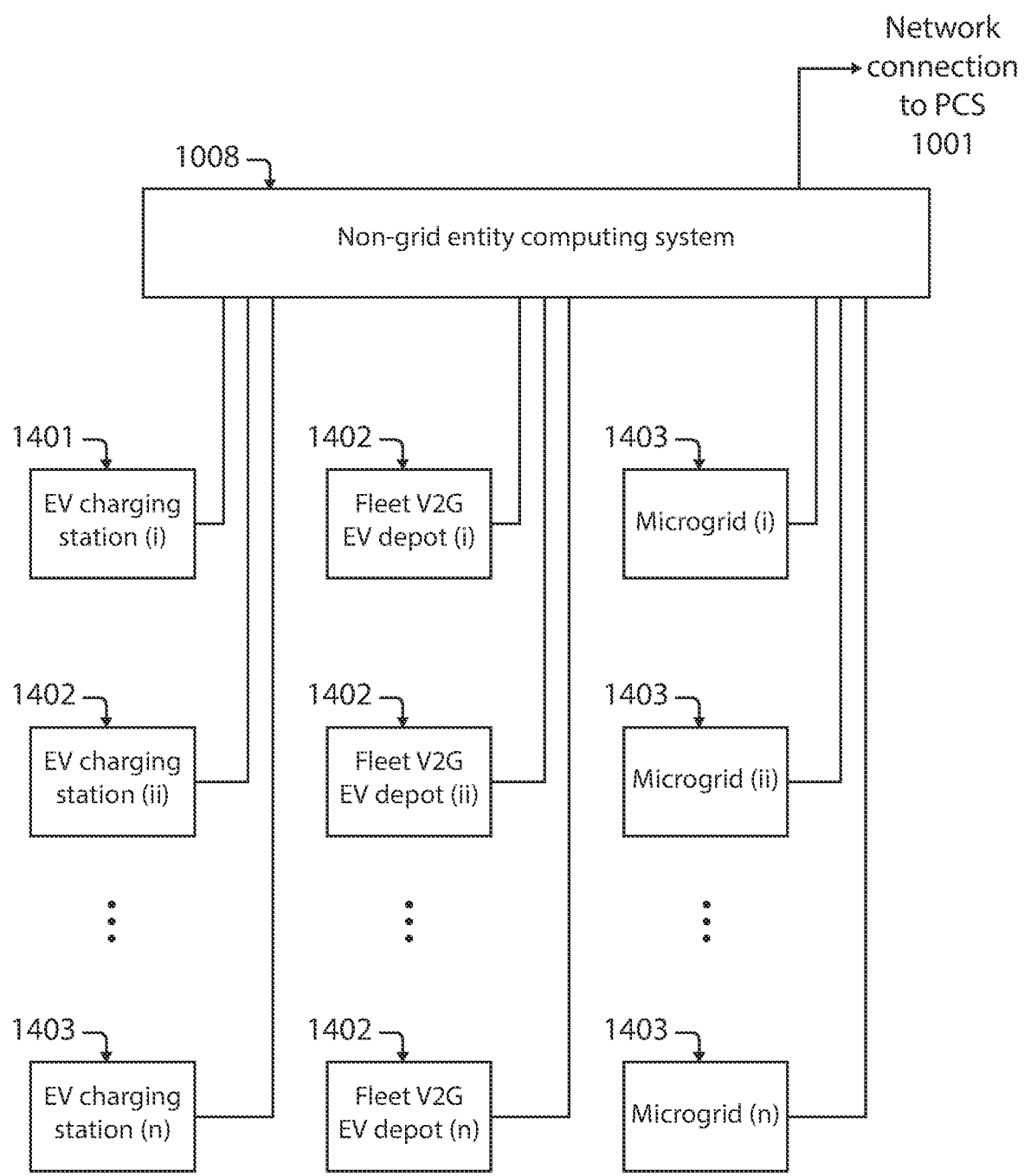
FIG. 14 depicts a schematic of an embodiment of a non-grid entity coordinating computing system.

FIG. 14 depicts non-grid entity coordinating computing system 1008. Non-grid entity coordinating computing system 1008 may communicate with one or more EV charging stations 1401, wherein each instance of EV charging station 1401 has a computer system configured to communicate with non-grid entity coordinating computing system 1008.

Further, non-grid entity coordinating computing system 1008 may communicate with one or more vehicle-to-grid depots for EV fleets 1402, wherein each instance of vehicle-to-grid depot for EV fleet 1402 has a computer system configured to communicate with non-grid entity coordinating computing system 1008.

Further, non-grid entity coordinating computing system 1008 may communicate with one or more microgrids 1403, wherein each instance of microgrid 1403 has a computer system configured to communicate with non-grid entity coordinating computing system 1008.

Preferably, non-grid entity coordinating computing system 1008 monitors MGR charging services provided to EV charging stations 1401, vehicle-to-grid depots for EV fleets 1402 and microgrids 1403 in real time. Also preferably, non-grid entity coordinating computing system 1008 analyzes said MGR charging services and transfers data concerning operations to distribution and transmission computing system 1006, for further communication of said data to local distribution companies 1201, balancing authorities 1202, independent system operators 1203 and governmental authorities 1204.

Figure 15:
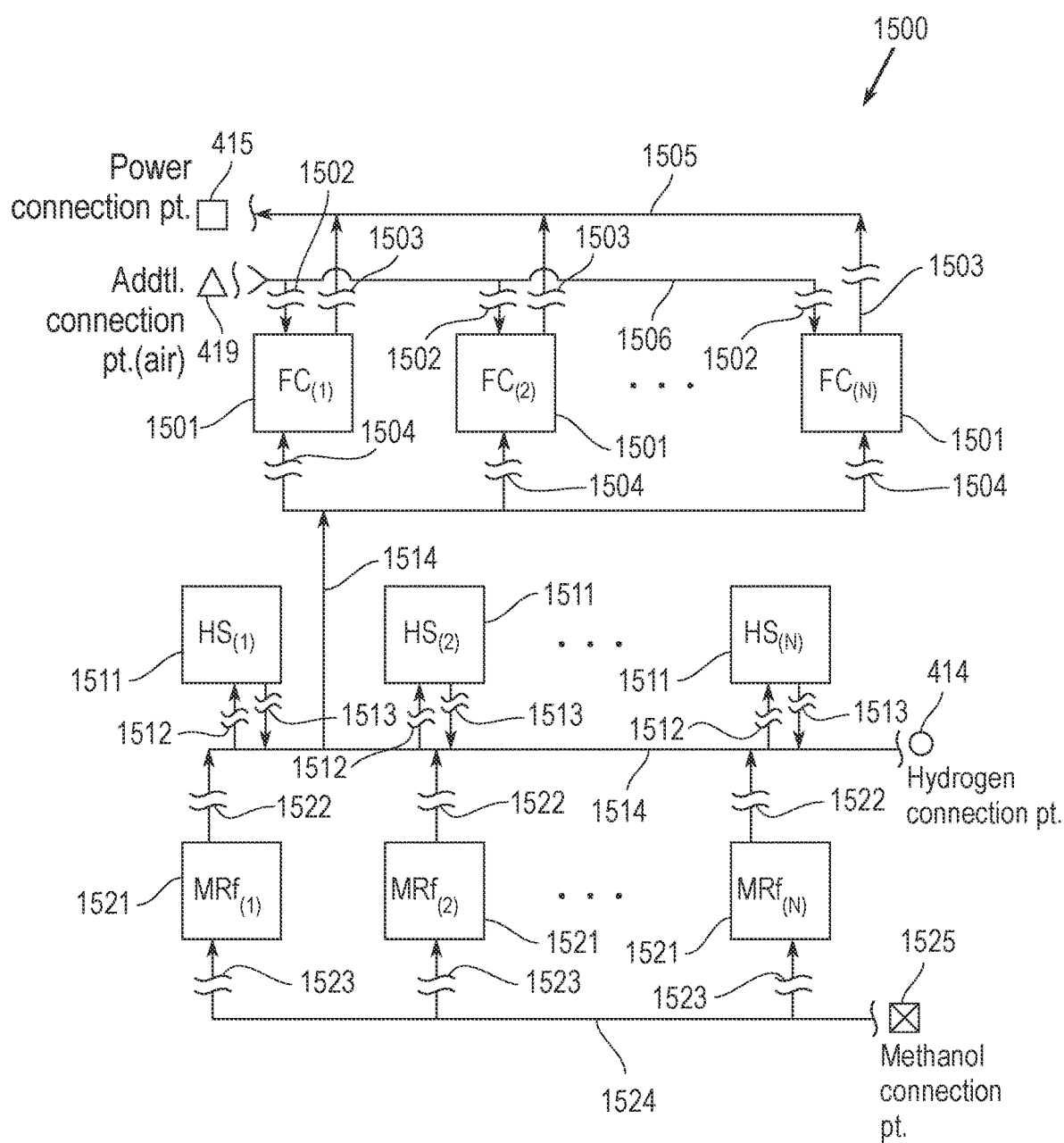
FIG. 15 depicts a schematic of an embodiment of a structural base.

FIG. 15 depicts a embodiment of a structural base 1500 for an MGR. Structural base 1500 may serve to support and provision the fuel cell(s) and other devices which comprise an MGR. Alternatively, structural base 1500 may also support and provision the various other devices which comprise the balance of plant used to support an given MGR. Devices comprising balance of plant for the support of fuel cells include air compressors, hydrogen pumps, water pumps, and other devices known in the art, which devices are employed to support the operation of fuel cell stacks for mobile use and/or for stationary use.

Structural base 1500 further includes certain conduits and connections to which aspects of the MGR and other devices may be advantageously affixed. For example, such conduits and connections may support the operation of at least one fuel cell stack.

Conduits of various types are known in the art, including (i) conduits to move gases or liquids (or other forms of matter, e.g., particulate solids, emulsions, etc.) from source (or sources) to destination (or destinations); (ii) conduits to direct electromagnetic signals (e.g., digital or analog data communication lines) from source (or sources) to destination (or destinations), and (iii) conduits to convey electrical power (whether in the form of direct current or alternating current) from source (or sources) to destination (or destinations).

On occasion, operational conditions may require that for a given conduit, the direction of material flow, the transmission of electromagnetic signals, or the provision of DC or AC power may be reversed, with a source and destination of a respective conduit reversing roles.

Conduits may be connected to their respective offboard source or destination by a temporary connection. Such connections may be accomplished by prior art methods. For example, tethers are flexible lines which provide for directing the movement of gases, liquids, signal or power from source (facility) to destination (vehicle). Such tethers may be employed at gas stations, BEV charging stations and other facilities, where the offboard aspect of the connection to a conduit for fuel, signal or power is located at the free end of the tether (its "head").

Tethers may be configured to supply the matter, signal or power they transmit. Alternatively, they may be configured to receive. Additionally, tethers may be configured to both supply and receive if they are bi-directional.

Various types of connection fittings (e.g., male and female ended connectors) are known in the art. Such connection fittings, and others known in the art, may provide connections that are both secure and readily disconnectable when connecting conduits to sources or destinations. This aspect of a connection fitting is advantageous in mobile applications, when circumstances often require moving a mobile device to another location, disconnecting the device for service, etc. Such connection fittings are often referred to as quick connect, quick release, etc.

Typically, tethers have two ends, one of which is permanently affixed to a stationary point, which point serves as the source or destination of the aspect (matter, signal, electrical power, etc.) to be supplied or received. The other end of the tether is its head, which head comprises a connection fitting configured to connect with a corresponding fitting on the intended mobile device which is the source or destination of the aspect to be supplied.

Alternatively, it is the mobile device to which the permanently affixed end of the tether is attached, with the head of the tether configured to connect to a stationary point. Such configurations are seen, for example, on trucks which deliver fuel or other liquids to stationary facilities.

Conduits depicted in FIG. 15 include conduit 1505, conduit 1506, conduit 1514 and conduit 1524.

FIG. 15 depicts that structural base 1500 supports one or more of FC, HS and MFr, including FC 1501, HS 1511 and MFr 1521. Each is configured to be temporarily connected by means of suitable fittings as described below.

Conduit 1505 is connected to power connection point 415, to which it conveys power generated by the at least one or more fuel cell stacks of FC 1501.

Conduit 1506 is connected to additional connection point 419, from which it conveys at least air to the at least one or more fuel cell stacks of FC 1501.

Conduit 1514 is connected to hydrogen connection point 414, from which it may supply or receive hydrogen. Additionally, conduit 1514 may supply hydrogen to the at least one or more fuel cell stacks of FC 1501. Additionally, conduit 1514 may supply hydrogen to, or receive hydrogen from, the at least one or more units of hydrogen storage HS 1511. Further, conduit 1514 may receive hydrogen from the at least one or more methanol reformers of MFr 1521.

Conduit 1524 is connected to methanol connection point 1525, from which it conveys methanol to the at least one or more methanol reformers of MFr 1521.

FC 1501 comprises at least one or more fuel cell stacks. Operation of FC 1501 is supported by conduit 1505, conduit 1506 and conduit 1514. Preferably, structural base 1500 is configured to operate with at least one FC 1501.

FC 1501 may be connected at least temporarily to conduit 1505 at connection point 1503. Further, FC 1501 may be connected at least temporarily to conduit 1506 at connection point 1502. Further, FC 1501 may be connected at least temporarily to conduit 1514 at connection point 1504.

Conduit 1505 provides FC 1501 with a pathway for the power which FC 1501 generates, directing the electric current from the source at FC 1501 to the destination at power take-off connection point 415. Power take-off connection point 415 is also depicted in FIGS. 4B and 4C.

Conduit 1506 provides with a pathway for the supply of at least air to FC 1501, directing at least the air from the source at additional connection point 419 to the destination at FC 1501. Additional connection point 419 is also depicted in FIG. 4C.

Conduit 1514 provides with a pathway for the supply of hydrogen to FC 1501, directing the hydrogen from the source at hydrogen connection point 414 to the destination at FC 1501. Hydrogen connection point 414 is also depicted in FIGS. 4B and 4C.

Conduit 1514 is also configured to both supply and receive hydrogen from hydrogen supply HS 1511. Additionally, HS 1511 may be connected at least temporarily to conduit 1514 at connection point 1512, and at connection point 1513.

Conduit 1514 is also configured to receive hydrogen from methanol reformer MRf 1521. Additionally, MRf 1521 may be connected at least temporarily to conduit 1514 at connection point 1522.

Conduit 1514 is also configured to both supply and receive hydrogen from Conduit 1524 is configured to provide methanol to methanol reformer MRf 1521. Additionally, MRf 1521 may be connected at least temporarily to conduit 1524 at connection point 1523.

Figures 16A, 16B:
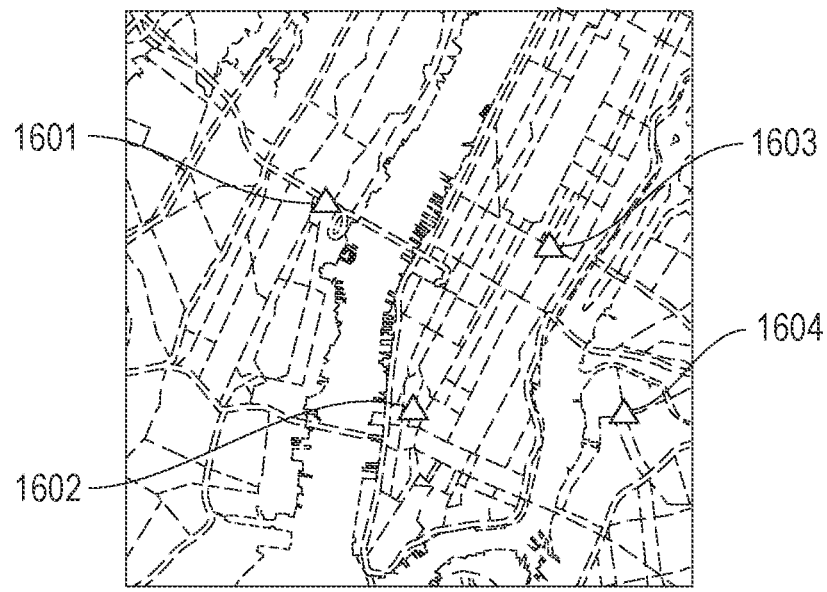
FIG. 16A depicts a schematic of an embodiment comprising a set of RDS facilities located across an area on a map.
FIG. 16B depicts an embodiment of a table relating to a set of MGRs allocated across a set of RDS facilities.

FIG. 16A depicts a map of southern Manhattan, New York and the adjacent environs, wherein four illustrative locations are noted on the map. FIG. 16A further depicts that the four locations depict individual RDS facilities, including RDS 1601, RDS 1602, RDS 1603 and RDS 1604.

Each of the four depicted RDS facilities comprises certain aspects of the RDS embodiments depicted in at least FIGS. 4A, 4B, 4C, 4D, 4E and 4F (but are not so limited), thereby providing four distinct facilities at different locations, at each of which various embodiments of MGRs may be docked.

FIG. 16B depicts a table 1611 listing a set of illustrative allocations of MGRs at RDS 1601, RDS 1602, RDS 1603 and RDS 1604, the successive illustrative values of which are shown to change over time, as denoted in table 11 for each RDS facility. Further, MGRs at at each RDS facility may comprise, but are not limited to, such embodiments as depicted in FIGS. 2A, 2B, 3A and 3B.

Table 1611 further depicts that the four RDS 1601, 1602, 1603 and 1604 are represented by the respective numbers 1, 2, 3 and 4 (e.g., "RDS No. 1 (40 Docks)" corresponds to RDS 1601). Table 1611 further depicts that the four successive times at which the number of MGRs are considered are represented by the respective numbers 1, 2, 3 and 4 (e.g., "At time 1, no. of docked MGRs"). Further, the right-hand-most column headed "Total MGRs" depicts the total number of MGRs which are docked across all four RDS 1601, 1602, 1603 and 1604 at each of the successive times 1, 2, 3, and 4.

Certain of the RDS facilities are depicted as having a higher allocation of MGR at a given time, others having a lower allocation of MGR at that same time. In a case where all MGR have the same power and other operating parameters, the number of MGR at a given RDS facility at a given time would be directly proportional to how much power would be available from the respective RDS facility. Further, relationships between the embodied MGRs and RDSs may comprise, but are not limited to, the embodiments as described throughout this application, including but not limited to FIG. 5 and FIG. 6 and the related text.

Alternatively, embodiments are possible where the maximum power of MGRs varies from one MGR to another MGR. Additionally, further embodiments are possible where the type of FC employed may vary from one MGR to another (e.g., PEM FC on some, SOFC on others, or a plurality of FC types on a single MGR). Additionally, further embodiments are possible where the type of fuel available may vary across the RDS facilities available for docking. Other variations in the properties of FC, reformer, hydrogen supply and storage, and other operating parameters will also be apparent to a person having ordinary skill in the art.

For example, where each MGR has a maximum of 100 kw of power, table 1611 indicates that the power available at time 1 for RDS 1601, RDS 1602, RDS 1603 and RDS 1604 (represented in table 1611 as RDS No. 1, RDS No. 2, RDS No. 3, and RDS No. 4) would be 2.0 MW, 1.5 MW, 1.0 MW and 0.2 MW, respectively. At other successive times 2, 3 and 4, RDS 1601, RDS 1602, RDS 1603 and RDS 1604 would have accordingly varying amounts of power.

When taken together in the context of this application, FIGS. 16A and 16B depict an embodiment that may be advantageously deployed by a utility customer, a utility, a balancing area authority, an independent service operator, or other grid-regulating entity. Further, the embodiment provides a generation resource that may be advantageously deployed by an entity which is not a utility customer. Further, an entity which is not a utility customer may (or may not) be connected to the local grid.

Further, a person having ordinary skill in the art would recognize the embodiment may comprise a distributed energy resource, or distributed generation.

The embodiment provides for the generation of electrical power for use by a utility customer.

The embodiment further provides for the generation of electrical power across the service area of a utility, a balancing area authority, an independent service operator, or other grid-regulating entity. The embodiment further provides that the amount of power generated by a plurality of MGRs allocated across a plurality of RDSs is dispatchable over both time and location. The embodiment further provides that the maximum amount of power which may be generated at a particular RDS may be varied in accordance with the needs of a utility customer, a utility, a balancing area authority, an independent service operator, or other grid-regulating entity. The embodiment further provides that the maximum amount of power generated at a particular RDS facility may be determined by the number and power of individual MGRs which are docked at that RDS facility.

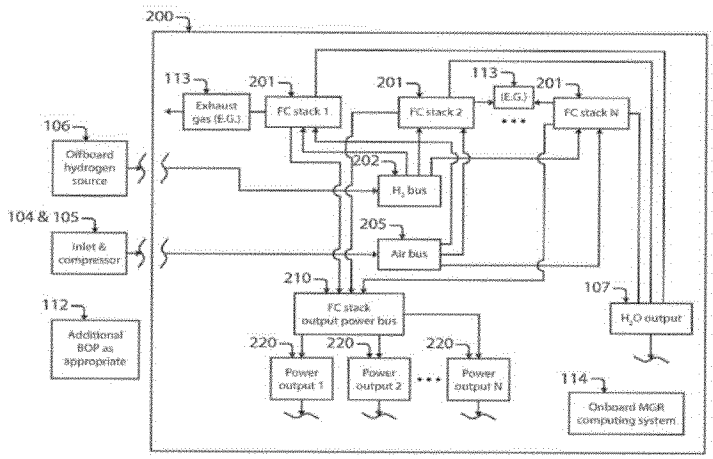

The invention claimed is:

1. A mobile generation resource, comprising:
   a vehicle;
   a plurality of fuel cell stacks positioned in the vehicle, each fuel cell stack being to use hydrogen to generate electricity;
   a first conduit positioned on the vehicle and coupled to the plurality of fuel cell stacks via a first bus, the first conduit being connectable to an offboard source of hydrogen so as to deliver hydrogen to the plurality of fuel cell stacks via the first bus;
   a second conduit positioned on the vehicle and coupled to the plurality of fuel cell stacks via a second bus, the second conduit being connectable to an offboard source of air so as to deliver air to the plurality of fuel cell stacks via the second bus; and
   a third conduit positioned on the vehicle and coupled to the plurality of fuel cell stacks via a third bus, the third conduit being configured to a deliver electricity generated by the fuel cell stacks to an offboard load via the third bus.

2. A mobile generation resource, comprising:
   a mobile vehicle;
   a plurality of fuel cell stacks, onboard the vehicle, each fuel cell stack being configured to use hydrogen to generate power;
   a first onboard supply line coupled to the plurality of fuel cell stacks via a first bus, the first onboard supply line providing hydrogen to the plurality of fuel cell stacks via the first bus;
   a second onboard supply line coupled to the plurality of fuel cell stacks via a second bus, the second onboard supply line providing compressed air to the plurality of fuel cell stacks via the second bus;
   a third onboard supply line coupled to the plurality of fuel cell stacks via a third bus, the third onboard supply line being configured to provide a conduit for electricity generated by the fuel cell stacks via the third bus; and
   a hydrogen supply operatively connected to the first onboard supply line,
   wherein the first bus is configured to distribute the hydrogen across the plurality of fuel cell stacks homogeneously.

3. The mobile generation resource of claim 2, further comprising an air compressor coupled to the second onboard supply line.

* * * * *

UNITED STATES PATENT AND TRADEMARK OFFICE
CERTIFICATE OF CORRECTION

PATENT NO. : 12,046,780 B1
APPLICATION NO. : 17/731937
DATED : July 23, 2024
INVENTOR(S) : Carl W. Leighton It is certified that error appears in the above-identified patent and that said Letters Patent is hereby corrected as shown below:

On the Title Page

Please delete the Title page and insert the Title page shown on the attached Title page.

Signed and Sealed this
Twenty-second Day of October, 2024

Katherine Kelly Vidal
Director of the United States Patent and Trademark Office

(12) United States Patent
Leighton

(10) Patent No.: US 12,046,780 B1
(45) Date of Patent: Jul. 23, 2024

(54) FUEL CELLS AS POWER SOURCES FOR CHARGING ELECTRIC VEHICLES AND OTHER ELECTRIC LOADS

(71) Applicant: Hybiquity, Inc., White Plains, NY (US)

(72) Inventor: Carl W. Leighton, White Plains, NY (US)

(73) Assignee: Hybiquity, Inc., White Plains, NY (US)

( * ) Notice: Subject to any disclaimer, the term of this patent is extended or adjusted under 35 U.S.C. 154(b) by 0 days.

(21) Appl. No.: 17/731,937

(22) Filed: Apr. 28, 2022

Related U.S. Application Data

(60) Provisional application No. 63/180,922, filed on Apr. 28, 2021.

(51) Int. Cl.
*B60L 53/30* (2019.01)
*B60L 53/54* (2019.01)
*H01M 8/04082* (2016.01)
*H01M 8/04089* (2016.01)

(52) U.S. Cl.
CPC ........ *H01M 8/04201* (2013.01); *B60L 53/30* (2019.02); *B60L 53/54* (2019.02); *H01M 8/04089* (2013.01)

(58) Field of Classification Search
CPC ......... H01M 8/04201; H01M 8/04089; B60L 53/30; B60L 53/54
See application file for complete search history.

(56) References Cited

U.S. PATENT DOCUMENTS

2016/0090189 A1* 3/2016 Wangemann ......... B64D 41/00 60/698

OTHER PUBLICATIONS

Estimated U.S. Energy Consumption in 2021 published by Lawrence Livermore National Laboratory (Mar. 2022) accessed at https://flowcharts.llnl.gov/sites/flowcharts/files/2022-04/Energy_2021_United-States_0.png, accessed on Apr. 24, 2022.
Report: How Are We Going to Build All That Clean Energy Infrastructure, Reed et al., Niskanen Center, published Aug. 2021 accessed at https://www.niskanencenter.org/wp-content/uploads/2021/08/CATF_Niskanen_CleanEnergyInfrastructure_Report.pdf, accessed on Apr. 24, 2022.
Hiroyuki Yumiya, et al. Toyota Fuel Cell System (TFCS). World Electric Vehicle Journal, vol. 7, 2015. 8 pages.
(Continued)

*Primary Examiner* — Ellen M McAvoy
*Assistant Examiner* — Chantel Graham
(74) *Attorney, Agent, or Firm* — Leason Ellis LLP

(57) ABSTRACT

A mobile generation resource (MGR) comprises a PEM fuel cell stack, hydrogen inputs and a hydrogen bus. A first hydrogen input receives hydrogen at 200 bars pressure which is stored in an onboard hydrogen tank. A second hydrogen input receives hydrogen at a pressure of 100 bars or less. The hydrogen bus, controlled by an MGR computing system, selects either the onboard hydrogen tank or the second hydrogen input as a hydrogen source for the fuel cell stack. A power take-off connection, cable and adapter provide DC electricity produced by the fuel cell stack at a power of at least 50 kilowatts. The MGR computing system communicates with the hydrogen bus and the power take-off connection, cable and adapter. A MGR user app instructs the MGR computing system to select the active source of hydrogen and to direct power produced by the fuel cell stack to the power take-off.

3 Claims, 24 Drawing Sheets